US008239923B2

(12) United States Patent
Kirshnan et al.

(10) Patent No.: US 8,239,923 B2
(45) Date of Patent: Aug. 7, 2012

(54) CONTROLLING COMPUTER PROGRAM EXTENSIONS IN A NETWORK DEVICE

(75) Inventors: Mayilraj Kirshnan, Santa Clara, CA (US); Kollivakkam Raghavan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1132 days.

(21) Appl. No.: 11/451,967

(22) Filed: Jun. 12, 2006

(65) Prior Publication Data

US 2006/0288404 A1    Dec. 21, 2006

Related U.S. Application Data

(60) Provisional application No. 60/692,715, filed on Jun. 21, 2005.

(51) Int. Cl.
*G06F 21/00* (2006.01)
(52) U.S. Cl. ............. 726/5; 726/1; 726/2; 726/3; 726/4; 726/26; 726/27; 726/28; 726/29; 726/30; 713/164; 713/165; 713/166; 713/167; 709/224; 709/225; 709/226; 709/227; 709/228; 709/229
(58) Field of Classification Search .. 707/9; 726/26–33, 726/1–5; 713/201, 154, 164–167
See application file for complete search history.

(56) References Cited

U.S. PATENT DOCUMENTS

| | | | |
|---|---|---|---|
| 5,812,763 A * | 9/1998 | Teng | 726/25 |
| 6,125,447 A * | 9/2000 | Gong | 726/17 |
| 6,240,414 B1 * | 5/2001 | Beizer et al. | 1/1 |
| 6,611,526 B1 | 8/2003 | Chinnaswamy et al. | |
| 6,718,386 B1 * | 4/2004 | Hanfland | 709/225 |
| 6,772,211 B2 | 8/2004 | Lu et al. | |
| 7,032,031 B2 | 4/2006 | Jungck et al. | |

(Continued)

FOREIGN PATENT DOCUMENTS

WO    WO 03/021465 A1    3/2003

OTHER PUBLICATIONS

Raman et al., Discovery-Based Role Activations in Role-based Access Control, May 15, 2006, IT Laboratory and Department of Computer Science and Engineering the University of Texas at Arlington.*

(Continued)

*Primary Examiner* — Taghi Arani
*Assistant Examiner* — Josnel Jeudy
(74) *Attorney, Agent, or Firm* — Hickman Palermo Truong Becker Bingham Wong LLP

(57) ABSTRACT

A network infrastructure element such as a packet data router or switch hosts an application program and one or more user program extensions to the application program. Logic in the network element is configured to perform creating and storing one or more default program security permissions; receiving a user-defined security policy that defines one or more user extension security permissions for the one or more user program extensions; creating and storing only each of the one or more user extension security permissions that do not conflict with the default program security permissions; receiving a request from one of the user program extensions to access a resource of the apparatus or the network; permitting the request to access the resource or the network only when the access does not violate the user extension security permissions and the default program security permissions.

13 Claims, 13 Drawing Sheets

U.S. PATENT DOCUMENTS

| | | |
|---|---|---|
| 7,114,008 B2 | 9/2006 | Jungck et al. |
| 7,321,556 B1 | 1/2008 | Parekh et al. |
| 7,330,908 B2 | 2/2008 | Jungck |
| 7,373,659 B1 * | 5/2008 | Vignoles et al. .............. 726/11 |
| 7,415,512 B1 | 8/2008 | Moon |
| 7,421,695 B2 | 9/2008 | Murray et al. |
| 2001/0047422 A1 | 11/2001 | McTernan et al. |
| 2002/0069279 A1 | 6/2002 | Romero et al. |
| 2002/0105911 A1 | 8/2002 | Pruthi et al. |
| 2002/0107951 A1 | 8/2002 | Teague et al. |
| 2002/0114274 A1 | 8/2002 | Sturges et al. |
| 2002/0143981 A1 | 10/2002 | DeLima et al. |
| 2002/0156962 A1 * | 10/2002 | Chopra et al. .............. 711/3 |
| 2002/0163933 A1 | 11/2002 | Benveniste |
| 2002/0191622 A1 | 12/2002 | Zdan |
| 2002/0194342 A1 | 12/2002 | Lu et al. |
| 2003/0005117 A1 | 1/2003 | Kang et al. |
| 2003/0009571 A1 | 1/2003 | Bavadekar |
| 2003/0036897 A1 | 2/2003 | Flores et al. |
| 2003/0078031 A1 | 4/2003 | Masuda |
| 2003/0112809 A1 | 6/2003 | Bharali et al. |
| 2003/0177183 A1 | 9/2003 | Cabrera et al. |
| 2003/0202535 A1 | 10/2003 | Foster et al. |
| 2003/0217171 A1 | 11/2003 | Von Stuermer et al. |
| 2004/0039940 A1 | 2/2004 | Cox et al. |
| 2004/0162871 A1 | 8/2004 | Pabla et al. |
| 2004/0205336 A1 | 10/2004 | Kessler et al. |
| 2004/0260760 A1 | 12/2004 | Curnyn |
| 2004/0267920 A1 | 12/2004 | Hydrie et al. |
| 2004/0267933 A1 | 12/2004 | Przybylski et al. |
| 2005/0005031 A1 | 1/2005 | Gordy et al. |
| 2005/0025091 A1 | 2/2005 | Patel et al. |
| 2005/0102393 A1 | 5/2005 | Murray et al. |
| 2005/0148314 A1 | 7/2005 | Taglienti et al. |
| 2005/0213591 A1 | 9/2005 | Nakazawa et al. |
| 2005/0228893 A1 | 10/2005 | Devarapalli et al. |
| 2005/0234856 A1 * | 10/2005 | Baumhof .............. 707/1 |
| 2005/0252970 A1 | 11/2005 | Howarth et al. |
| 2005/0286461 A1 | 12/2005 | Zhang et al. |
| 2006/0015699 A1 | 1/2006 | Fujiwara et al. |
| 2006/0123226 A1 | 6/2006 | Kumar et al. |
| 2006/0129689 A1 | 6/2006 | Ho et al. |
| 2006/0155862 A1 | 7/2006 | Kathi et al. |
| 2006/0155969 A1 | 7/2006 | Yoda et al. |
| 2006/0236062 A1 | 10/2006 | Boss et al. |
| 2006/0256768 A1 | 11/2006 | Chan |
| 2006/0265733 A1 * | 11/2006 | Chen et al. .............. 726/1 |
| 2007/0055864 A1 | 3/2007 | Tock et al. |

OTHER PUBLICATIONS

International Searching Authority, "Notification of Transmittal of the International Search Report and the Written Opinion of the International Searching Authority, or the Declaration", International application No. PCT/US05/46149, dated Jul. 20, 2007, 9 pages.

CLAIMS, International application No. PCT/US05/46149, 10 pages.

International Searching Authority, "Notification of Transmittal of the International Search Report and the Written Opinion of the International Searching Authority, or the Declaration," PCT/US2006/024375, dated Oct. 17, 2006, 10 pages.

Current Claims, PCT/US2006/024375, 6 pages.

Decasper, Dan et al., "Router Plugins: A Software Architecture for Next-Generation Routers," IEEE ACM Transactions on Networking, vol. 9, No. 1, Feb. 2000, XP011038838, 14 pages.

U.S. Appl. No. 11/473,298, filed Jun. 21, 2006, Office Action Feb. 4, 2010.

Schramm, C. et al., "Application-Oriented Network Modeling with Mobile Agents," 1998, IEEE (5 pages).

* cited by examiner

CONTROLLING COMPUTER PROGRAM EXTENSIONS IN A NETWORK DEVICE

PRIORITY CLAIM

This application claims benefit under 35 U.S.C. 119(e) of prior provisional application 60/692,715, filed Jun. 21, 2005, the entire contents of which are hereby incorporated by reference for all purposes as if fully set forth herein.

CROSS-REFERENCE TO RELATED APPLICATIONS

This application is related to U.S. patent application Ser. No. 11/043,857, filed Jan. 25, 2005, entitled "APPLICATION LAYER MESSAGE-BASED SERVER FAILOVER MANAGEMENT BY A NETWORK ELEMENT," by Sunil Potti et al.; U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", by Pravin Singhal et al., filed on Nov. 17, 2004; U.S. patent application Ser. No. 10/997,616, entitled "CACHING CONTENT AND STATE DATA AT A NETWORK ELEMENT", by Alex Yiu-Man Chan et al., filed on Nov. 23, 2004; U.S. patent application Ser. No. 11/005,978, entitled "PERFORMING MESSAGE PAYLOAD PROCESSING FUNCTIONS IN A NETWORK ELEMENT ON BEHALF OF AN APPLICATION", by Tefcros Anthias et al., filed on Dec. 6, 2004; U.S. patent application Ser. No. 11/007,421, entitled "PERFORMING SECURITY FUNCTIONS ON A MESSAGE PAYLOAD IN A NETWORK ELEMENT", by Sandeep Kumar et al., filed on Dec. 7, 2004; U.S. patent application Ser. No. 11/007,152, entitled "NETWORK AND APPLICATION ATTACK PROTECTION BASED ON APPLICATION LAYER MESSAGE INSPECTION", by Sandeep Kumar et al., filed on Dec. 7, 2004; U.S. patent application Ser. No. 11/009,127, entitled "REDUCING THE SIZES OF APPLICATION LAYER MESSAGES IN A NETWORK ELEMENT", by Ricky Ho et al., filed on Dec. 10, 2004; U.S. patent application Ser. No. 11/009,270, entitled "GUARANTEED DELIVERY OF APPLICATION LAYER MESSAGES BY A NETWORK ELEMENT", by Tefcros Anthias et al., filed on Dec. 10, 2004; U.S. patent application Ser. No. 11/031,106, filed Jan. 5, 2005, entitled "INTERPRETING AN APPLICATION MESSAGE AT A NETWORK ELEMENT USING SAMPLING AND HEURISTICS," by Tefcros Anthias et al., filed on Jan. 5, 2005, and U.S. patent application Ser. No. 11/031,184, filed on Jan. 6, 2005, entitled "DATA TRAFFIC LOAD BALANCING BASED ON APPLICATION LAYER MESSAGES," by Hari Kathi et al., filed on Jan. 6, 2005, the entire contents of which are hereby incorporated by reference for all purposes as if fully set forth herein.

FIELD OF THE INVENTION

The present invention generally relates to data processing techniques performed within network infrastructure elements such as routers and switches. The invention relates more specifically to techniques for securing or controlling the behavior of computer program extensions or other custom code in a programmable network element such as a router or switch.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Software applications operating in a network environment exchange application messages. An "application message," or simply "message", as used herein, refers to a message emitted or consumed by a software element that is logically located at Layer 5 or higher of the OSI reference model. Messages may be contained in more than one data frame, packet or segment. For simplicity, the term "packet" is used to refer to a unit of organization under an internetworking protocol, such as data frame, packet or segment, at Layer 2, 3 or 4 of the OSI reference model.

Application end points such as clients and servers in a distributed system communicating over a network often need to authenticate users' credentials presented in an application message and, if the authentication succeeds, authorize the users for specific privileges for using system or application resources. Authentication and authorization usually is done by application end points. Application end points, or simply applications, are required to perform authentication and authorization operations relating to messages received. Under this approach, logic extracting user credentials from application messages is part of application processes. However, to perform the extraction, applications need to know specific details of application message formats such as where user credentials are stored.

Additionally, authentication or authorization logic often communicates with one or more authentication or authorization service providers or data stores. Thus, applications often need to know specific details of service providers or data stores such as where and how the user credentials extracted from messages can be compared with trusted user credentials kept by the service providers or data stores. To complicate the matter, some service providers or data stores may not be based on industry standards in providing the authentication or authorization related services.

Applications' needs for authentication and authorization may change. For example, service provider may change. An application may need to support LDAP, instead of Kerberos for authentication. Or an application may need to access a data store, instead of a service provider.

Furthermore, formats of application messages may change with respect to user credentials. User credentials may be specified in an application protocol header (say HTTP header) or SOAP header. Also they can come as a part of application message body in an application specific format, or in a payload.

Generally, in past approaches, in order to handle any of these changes, the implementation of the application has to be changed. This is time-consuming and requires significant resources in programming labor.

Further, in typical past approaches, the number of points at which authentication and authorization are performed is proportional to the number of application endpoints. This is a waste of application processing resources.

Also, in typical past approaches, authentication and authorization by an application can only authenticate and authorize based on user credentials present in an application message. Since the application typically is ignorant of what user credentials may present below OSI layer 5, authentication and authorization for such user credentials typically has to be performed elsewhere. An example of such user credentials is an SSL certificate. This results in a fragmented processing, waste of resources and potential inconsistent outcome.

In past approaches, network elements such as routers and switches generally have had limited or no support for application program extensibility, in which customers or users of the network elements can define their own software programs and upload the programs into the network element. To address the problems above relating to authentication and authorization, and other problems, Cisco Systems, Inc. has introduced Application Oriented Network (AON) technology, which provides an environment in which customers can create programs that can be dynamically loaded and executed on the network device.

The availability of extensible programs creates the possibility that a customer program will attempt to write system memory, change configurations, destroy disk files, or perform other operations that may be harmful or disruptive to the network element. The network element should be protected from such harm.

One approach to allow custom code to be uploaded into a network element involves creating a new image containing the new functionality. Access control and security for such code is controlled at build time, or by providing options to control behavior of the module via a command line interface. Thus, the problem of code behavior is addressed in a static manner, and cannot change dynamically after the code has been uploaded and executed. The standard security mechanism of the Java Virtual Machine (JVM) does not allow the running security policy to be changed dynamically. In other words, changing the security policy requires the JVM to be restarted, which is undesirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
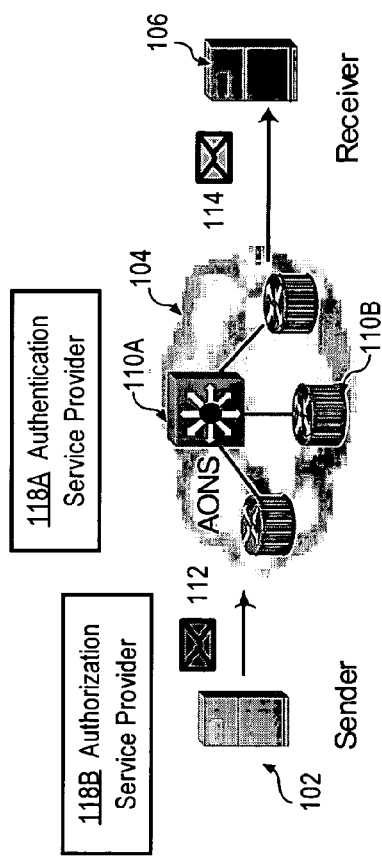
FIG. 1A is a block diagram that illustrates an overview of a network arrangement that can be used to implement an embodiment.

An apparatus and method for extensible authentication and authorization of identities present in an application message on a network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
3.0 AONS Implementation Examples
   3.1 AONS General Overview
   3.2 Multi-Blade Architecture
   3.3 AONS Blade Message Processing Framework
   3.4 Extension Package Implementation
4.0 Controlling Computer Program Extensions in a Network Device
5.0 Implementation Mechanisms-Hardware Overview
6.0 Extensions and Alternatives 1.0 General Overview The needs identified in the foregoing Background, and other needs and objects that will become apparent for the following description, are achieved in the present invention, which comprises, in one aspect, a data processing apparatus, comprising a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; a computer-readable storage medium having stored thereon an application program and one or more user program extensions to the application program; and logic configured to perform creating and storing one or more default program security permissions; receiving a user-defined security policy that defines one or more user extension security permissions for the one or more user program extensions; creating and storing only each of the one or more user extension security permissions that do not conflict with the default program security permissions; receiving a request from one of the user program extensions to access a resource of the apparatus or the network; permitting the request to access the resource or the network only when the access does not violate the user extension security permissions and the default system security permissions.

In one feature, the apparatus comprises a router or switch for a packet-switched network.

In another feature, the logic further comprises instructions which when executed cause permitting the request to access the resource or the network only when the access also does not violate Java® sandbox security permissions.

In still another feature, the logic causes creating and storing only each of the one or more user extension security permissions that do not conflict with the default system security permissions, except when the logic specifies that the user extension security permissions can override the default system security permissions.

In yet another feature the user-defined security policy comprises one or more extensible markup language (XML) documents each comprising one or more permission definitions each comprising a permission type, permission name, and one or more actions, and wherein each of the permission definitions is associated in the policy with a codebase identifier.

In another feature, the logic further is configured to cause the processor to perform parsing the user-defined security policy by storing the permission type, permission name, actions, and codebase identifier in a policy store; identifying a programmatic class of the user program extension that is associated with the request; determining a location from which the identified class has been loaded; determining a name of the resource from the request; determining an action associated with the request; searching the policy store for the location, name and action based on comparing the identified class to stored codebase identifiers.

A related feature involves first determining whether the request violates the user extension security permissions and generating a user extension permission exception when a violation is determined, and then determining whether the request violates the default system security permissions and generating a user extension permission exception when a violation is determined.

In other aspects, the invention encompasses a machine-implemented method and a computer-readable medium configured to carry out the foregoing steps.

2.0 Structural and Functional Overview

Figure 1B:
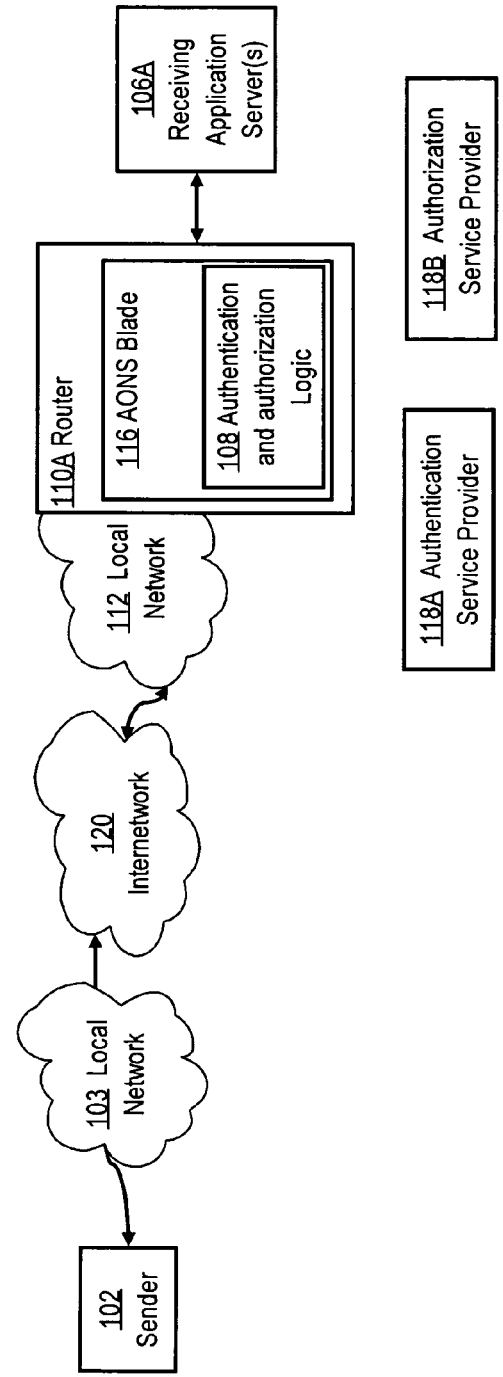
FIG. 1B is a block diagram showing authentication and authorization logic in a network infrastructure element such as a router, in one embodiment.

FIG. 1A is a block diagram of network elements involved in an extensible authentication approach according to an embodiment. FIG. 1B is a block diagram showing authentication and authorization logic in a network infrastructure element such as a router, in one embodiment.

Referring first to FIG. 1A, a sender 102 is coupled through a network 104 to a receiver 106. The network 104 comprises one or more network infrastructure elements 110, such as routers or switches. Each of the network elements 110 comprises one or more blades, bladelets, or other software elements, alone or in combination with hardware or firmware elements, that implement inspection, at various OSI layers, of packets received in association with an application message and related authentication and authorization functions as described herein.

A commercial embodiment of network elements 110A may comprise routers or switches from Cisco Systems, Inc., San Jose, Calif., with blades having Application-Oriented Networking Services (AONS) capabilities. In some embodiments, network elements 110A are termed "AONS nodes" or "AONS endpoints." Other network elements 110B may be non-AONS nodes. Further, network elements 110A need not use Cisco AONS technology; the network elements can comprise routers or switches that comprise other internal elements to perform extensible authentication and authorization functions as described herein. Thus, the use of AONS in an embodiment is not required, and all references herein to AONS elements are provided merely to illustrate a clear example, and not as limitations.

In an embodiment, the validation of an application message by network elements 110A involves accessing an authentication service provider 118A and an authorization service provider 118B.

The authentication service provider 118A may implement either standard-based or proprietary technology-based authentication services. Similarly, the authorization service 118B may implement either standard-based or proprietary technology-based authorization services. Examples of the standard-based authentication or authorization service providers include those based on LDAP, Kerberos, X509, or SAML. In some embodiments, authentication or authorization service providers such as 118A or 1181B may comprise database access routines and a database storing user credential and privilege information. Furthermore, in some embodiments, an authentication service provider and an authorization service provider can comprise a single authentication and authorization server.

As seen in FIG. 1B, sender 102 is coupled through a local network 103 to an internetwork 120 that is coupled to another local network 112. Either of the local networks 103 and 112 may have network elements 110 that implement the techniques herein. As an example, router 110A in local network 112 is equipped with an AONS blade 116, available from Cisco Systems, Inc. San Jose, Calif. The AONS blade 116 comprises one or more bladelets that form authentication and authorization logic 108. In certain embodiments all the network elements 110 include authentication and authorization logic 108, which comprises one or more computer programs, programmatic objects, or other software elements that implement the functions described herein.

Generally, the authentication and authorization logic 108 identifies user credentials in an application message. Examples of user credentials are peer SSL certificates, HTTP basic authentication scheme and parameters, or HTTP negotiate authentication data from message headers, and user/password token, SAML token, SPNEGO token or X509 token from a message body.

The authentication and authorization logic 108 performs authentication and authorization based on the user credentials that were identified. If the authentication and authorization of the application message succeeds, the application message is processed according to a policy. For example, the message is forwarded to a receiving application server 106A. Thus, in the arrangement of FIG. 1B, router 110 is proximate to the receiving application servers 106A, and can perform authentication and authorization for all the application servers. For example, sender 102, and other senders at different locations in networks 103, 120, might send different requests to different instances of applications on different application servers 106A. The authentication and authorization logic 108 can perform application message authentication and authorization for all such requests, relieving the application instances and application servers 106A from the processing burden of authentication and authorization for each request.

Alternatively, if router 110 is located in local network 103, the router can perform application message authentication and authorization when sender 102 emits messages and before the messages reach the application servers 106A. In all such cases, the data processing efficiency of the application servers 106A is greatly improved because router 110 is responsible for message authentication and authorization, and the application servers are responsible only for performing substantive application functions.

When an application message authentication and authorization operation is performed in a network device, the operation can be performed on a device that is closer to the application that is sending the message or the application that is receiving the message. As a result, if there are multiple instances of an application running, possibly on different hosts, then a single device through which all the messages are passing can perform the needed authentication and authorization. Accordingly, efficiency of the overall network is improved.

In some embodiments, extensible authentication and authorization is provided by using a user configurable policy. In this approach, the user configurable policy specifies how an incoming message should be authenticated or authorized.

In one embodiment, through a user interface, a user is enabled in the user configurable policy to define a plurality of message types and associations each of which associates between a particular authentication method with a corresponding message type. In one embodiment, the policy is created at design time in advance of message processing, based on known characteristics of incoming messages and outgoing messages. The policy associates authentication methods or authorization methods with respective message types. The policy can also associate user credential location definitions that specify locations of user credentials with respective message types. For example, the policy can be created using AONS Design Studio (ADS), and downloaded to an AONS node via AONS Management Console (AMC). An ADS designer can select an authentication method for a message type among LDAP and Kerberos SPNEGO, X509 Certificate based authentication methods and extension authentication methods provided by extension packages, as further explained herein. Similarly, the ADS designer can select an authorization method for the message type among LDAP Group-, SAML Assertion-, and Rule-based methods and extension authorization methods provided by extension packages. During runtime, the authentication and authorization logic 108 retrieves the policy and an incoming message. The authentication and authorization logic 108 determines the application message type, identifies user credentials in the message, validates the incoming message by applying associated authentication and authorization methods, and, if successful, directs other elements of the network element 110A to process the message according to a success policy, e.g., to forward the message on a path to a receiving application server 106A.

Figure 2:
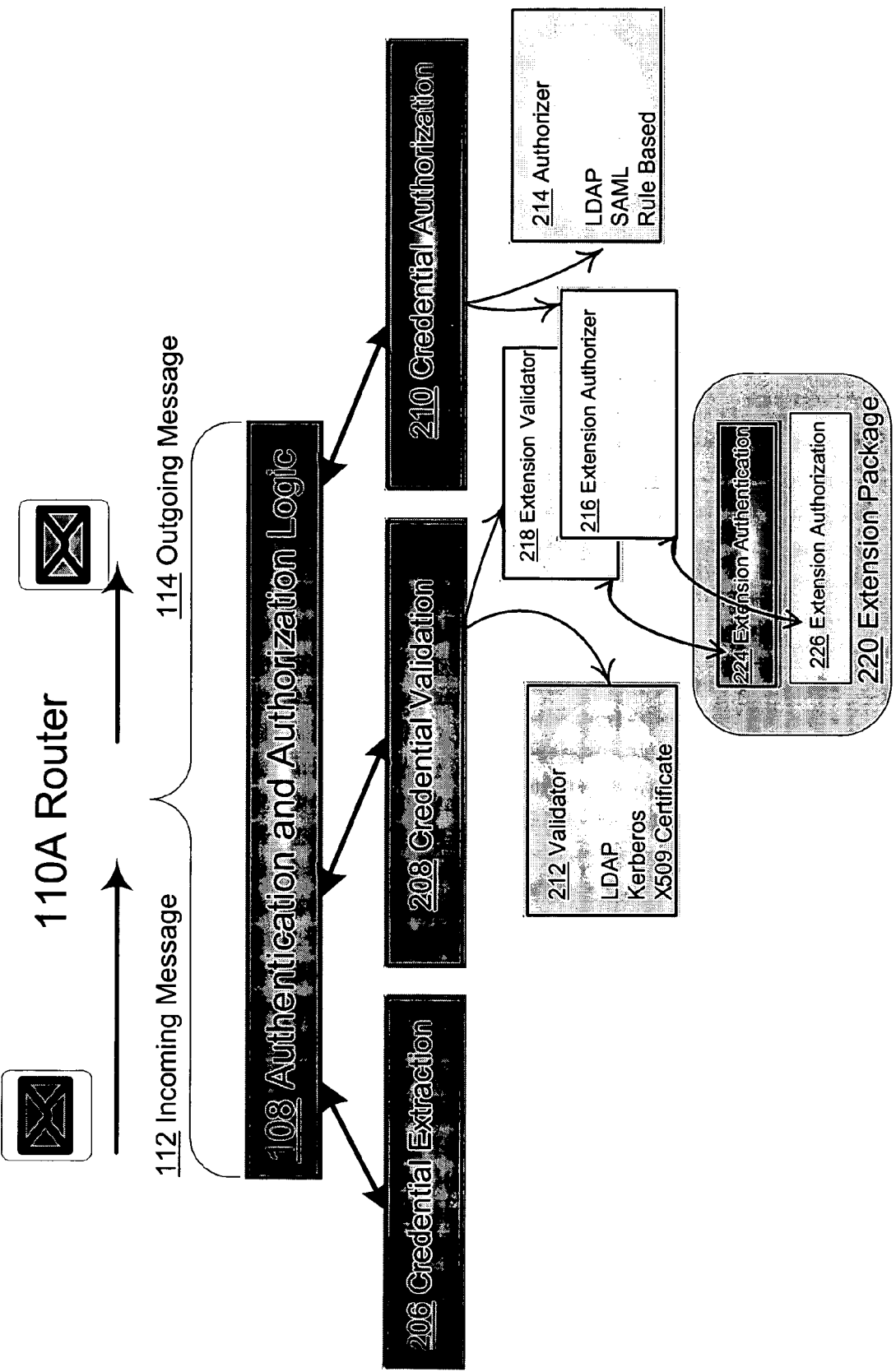
FIG. 2 is a block diagram of software elements that may be used to implement the authentication and authorization logic, in one embodiment.

FIG. 2 is a block diagram of software elements that can be used to implement the authentication and authorization logic 108 in an AONS blade 116 of a router, in one embodiment. The authentication and authorization logic 108 comprises logic for credential extraction 206, credential validation 208, and credential authorization 210. In one embodiment, the logic can take the form of one or more AONS bladelets. For example, credential extraction 206, credential validation 208, and credential authorization 210 can be implemented as "identify", "authenticate", and "authorize" bladelets, respectively.

Upon receiving an incoming message 112 on any network interface of the router, the credential extraction 206 inspects the message. Credential extraction 206 has access to user credential location definitions for various application message types. In a preferred embodiment, credential extraction 206 makes use of existing components in the network infrastructure element 110A that allow extraction or identification in packets associated with an application message of fields in various OSI layers. The search of user credential fields may be conducted on headers, data, or payloads at standard locations or non-standard locations, and additionally or alternatively, using name-value pairs or regular expressions. In one embodiment, credential extraction 206 identifies user credentials or a subset thereof in locations specified by standards. In another embodiment, the credential extraction identifies the user credentials or a subset thereof based on user credential location definitions for the message type. In yet another embodiment, credential extraction 206 identifies the user credentials from both locations identified by the standards and by the user credential location definitions.

Credential validation 208 authenticates an identity associated with the user credentials. In a preferred embodiment, credential validation 208 comprises a validator 212 for built-in authentication methods and an extension validator 218 for non built-in authentication methods, which may be developed before or after the network infrastructure element 110A is deployed. For the built-in authentication methods, a user or policy specifies which one is to be used for a particular application message type. For example, the authenticate bladelet embodiment of credential validation 208 in an AONS bladelet has built-in authentication methods based on LDAP, Kerberos SPNEGO or X509 Certificate.

The extension validator 218 can be configured to invoke an extension authentication 224 in extension packages 220 for authentication methods that do not have built-in support. The extension packages 220 for non built-in authentication methods may be deployed before or after the installation of the router 110A in a network. In a preferred embodiment, the authentication and authorization logic 108 does not require the presence of a particular extension package 220 unless a corresponding non built-in authentication method is to be supported. However, when a non built-in authentication method is to be supported at runtime, the extension validator 218 is configured accordingly and the extension authentication 224 is provisioned to the network infrastructure element 110A.

An extension authentication 224 can be developed in a programming language that makes use of application programming interfaces (APIs) to support a particular authentication method. For example, an extension authentication can be developed in JAVA that makes use of SiteMinder JAVA Agent APIs, available from Computer Associates, Inc. ("CA"), to support the SiteMinder Authentication. In a preferred embodiment, the configuration that directs the extension validator 218 to use the extension authentication thus developed can be specified in AONS Design Studio. Both the configuration and the extension authentication can be provisioned to the network infrastructure element 110A to form an extension package 220 before its use by the extension validator 218 at runtime. In a preferred embodiment, the configuration and the extension package can be pre-packaged into a downloadable file in AONS Design Studio, and subsequently downloaded to an AONS node.

When the extension authentication 224 is invoked, it is made available all the required and optional parameters by the authentication and authorization logic 108. The extension authentication 224 reads configuration parameters relevant to accessing an authentication service provider or a database that stores necessary information for authentication. In some embodiments, the parameter list, values, and access routines for parameters are configured for a particular authentication method and authentication service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authentication service provider such as SiteMinder Policy Server from CA.

At runtime, the extension authentication 224 uses the parameters, performs the authentication method, and returns the result to its caller.

The credential authorization 210 can be invoked to authorize privileges to an identity associated with the user credentials. In a preferred embodiment, the credential authorization 210 comprises an authorizer 214 for built-in authorization methods and an extension authorizer 216 for non built-in authorization methods, which may be developed later. For the built-in authentication methods, a user or policy specifies which one is to be used for a particular application message type. For example, the authorize bladelet embodiment of credential authorization 210 in an AONS bladelet has built-in authorization methods based on LDAP Groups, SAML Assertions or rules.

The extension authorizer 216 can be configured to invoke an extension authorization 226 in extension packages 220 for authorization methods that do not have built-in support. The extension packages 220 for non built-in authorization methods may be deployed before or after the installation of the router 110A in a network. In a preferred embodiment, the authentication and authorization logic 108 does not require a particular extension package 220 unless a corresponding non built-in authorization method is to be supported. However, when a non built-in authorization method is to be supported at runtime, the extension authorizer 216 is configured accordingly and the extension authorization 226 is transferred to the network infrastructure element 110A.

An extension authorization 226 can be developed in a programming language that makes use of application programming interfaces (hereinafter APIs) to support a particular authorization method. For example, an extension authorization can be developed in JAVA that makes use of SiteMinder JAVA Agent APIs to support SiteMinder Authorization. In a preferred embodiment, the configuration that directs the extension authorizer 216 to use the extension authorization thus developed can be specified in AONS Design Studio. Both the configuration and the extension authorization can be provisioned to the network infrastructure element 110A to form an extension package 220 before its use by the extension authorizer 216 at runtime. In a preferred embodiment, the configuration and the extension package can be pre-packaged into a downloadable file in AONS Design Studio, and subsequently downloaded to an AONS node.

When the extension authorization 226 is invoked, it is made available all the required and optional parameters by the authentication and authorization logic 108. The extension authorization 226 reads configuration parameters relevant to accessing an authorization service provider or a database that stores necessary information for authorization. In some embodiments, the parameter list, values, and access routines for parameters are configured for a particular authorization method and authorization service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authorization service provider such as SiteMinder Policy Server from CA.

At runtime, the extension authorization 226 uses the parameters, performs the authorization method, and returns the result.

If the authentication and authorization tasks complete successfully, the authentication and authorization logic 108 directs the application message to a receiving application server 106A.

Thus, the extension validator 218, extension authorizer 216, extension package 220, which may include extension authentication 224 or extension authorization 226, represent an extensibility mechanism for the authentication and authorization logic 108.

There may be multiple extension packages 220 deployed in a network infrastructure element 110A. In various embodiments, an extension package 220 may provide support for authentication only, or for authorization only, or both. Thus, the SiteMinder extension package, discussed above, which supports both authentication and authorization, is described solely to present a clear example and not as a limitation. Furthermore, an extension package 220 may provide support for authentication and/or authorization using service providers other than SiteMinder as discussed. In one embodiment, authentication and/or authorization service is provided by Tivoli Access Manager from International Business Machine Corp., Armonk, N.Y. Thus, network elements 110A need not depend on a particular authentication and/or authorization service provider such as SiteMinder. Any authentication and/or authorization provider that is capable of performing authentication and authorization service upon a request by an extension package described herein is within the scope of the present invention. Thus, the use of SiteMinder in an embodiment is not required, and all references herein to SiteMinder are provided merely to illustrate a clear example, and not as limitations.

In an embodiment, support for a new authentication or authorization method by the network infrastructure element 110A can be disabled or enabled without requiring changes in implementation or re-building of the network infrastructure element code. In this embodiment, a user can easily enable or disable a method for business reasons, such as a change in a business partner relationship involving an authentication or authorization service provider. Also, a supplier for network infrastructure element 110A may need to enable or disable support for a specific method based on a licensing agreement or possibly different product bundling needs.

Figure 3:
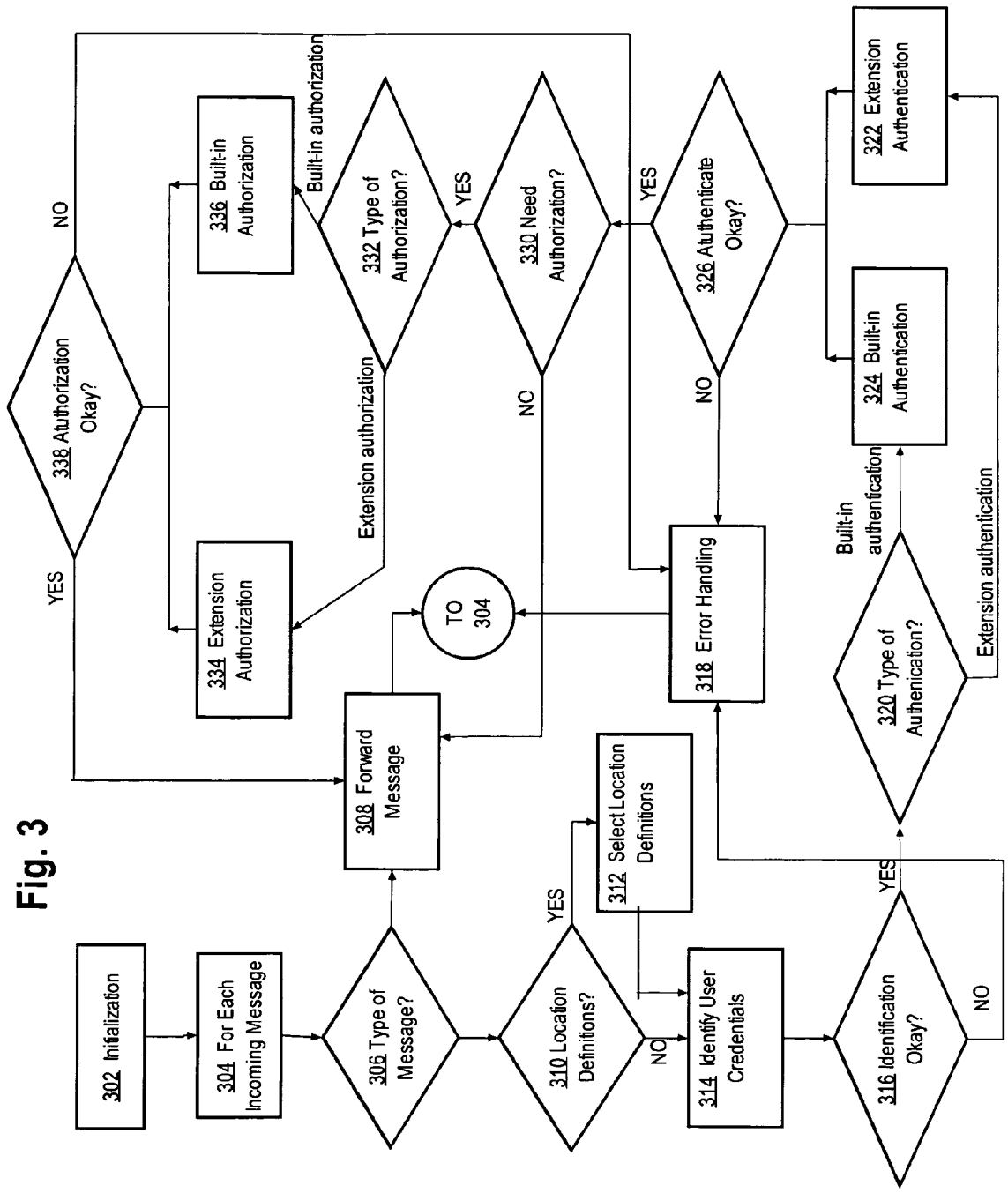
FIG. 3 is a flow diagram of one embodiment of a process of application message authentication and authorization.

FIG. 3 is a flow diagram of one embodiment of a process of application message authentication and authorization. In step 302, initialization is performed, for example, by the authentication and authorization logic 108. In one embodiment, initialization comprises reading configuration parameters, including a message type list, authentication method list, authorization method list, user credentials location definitions, and associations between a message type and its respective authentication and authorization methods and user credential location definitions.

At step 304, for each incoming message received from a data network coupled to the network infrastructure element 110A, certain other steps are performed. In step 306, the type of the application message is determined by the network infrastructure element 110A. The type of an application message may be determined on a number of attributes carried by the application message or the underlying packets associated with the application message. Attributes capable of identifying application message types include endpoints' addresses or ports, universal resource locations (URL) at HTTP level, special fields in the message, or regular expression patterns. Additionally or alternatively, attributes capable of identifying application include any standard or proprietary tokens embedded in a message or underlying packet that identifies a particular type for an application message. For example, a string constant denoting an application name may be embedded in an application message in a proprietary manner to identify a particular application type.

If the incoming message is not a type that has been configured for authentication and authorization, in step 308, the authentication and authorization logic passes the message to logic in the network infrastructure element 110A for further processing such as forwarding the message towards its intended destination. If the incoming message is a type of an application message that has been configured for authentication and authorization, in step 310, the credential extraction 206 determines whether user credential location definitions should be consulted. For a plurality of application message types, the user credentials may be located in standard locations. In step 314, the credential extraction 206 identifies the user credentials in those standard locations. For some application message types, on the other hand, the user credentials may be located in a proprietary locations or non-standard locations. In step 312, a user credential location is selected for definitions corresponding to one such application message type as appropriate and, in step 314, the user credentials in those locations are identified.

If step 316 determines that the identification of user credential has failed, then error handling is invoked at step 318. The error handling may include logging the error and suppressing the erroneous message from being further forwarded to its intended destination. If the identification of use credential is successful as determined at step 316, then the credential validation 208 is invoked, and at step 320, the process determines whether a built-in or extension authentication method is associated with the message type. If the incoming message is of a type that associates with an extension authentication method, then at step 322, processing is passed to the extension validator 218, which handles invocation of the extension authentication method provided by extension authentication 224 in extension package 220, and which passes all the parameters necessary or optional for the invocation of the extension authentication method. If the incoming message is of a type that associates with a built-in authentication method, at step 324, then processing is passed to the validator 212 for executing the specified built-in authentication method.

At step 326, the credential validation 208 determines the result of the authentication method, whether it is built-in or extension. If the authentication method has failed to authenticate the identity, processing is passed to step 318 for error handling. If the user identity associated with user credentials has been successfully authenticated, then credential authorization 210 is invoked, and at step 330 determines whether an authorization method has been specified for the message type. If not, the authentication and authorization logic passes the message at step 308 to logic in the network infrastructure element 110A for further processing such as forwarding the message towards its intended destination.

If the incoming message is of a type that associates with an extension authorization method, at step 334, processing is passed to the extension authorizer 216, which handles invocation of the extension authorization method provided by extension authorization 226 in extension package 220, and which passes all the parameters necessary or optional for the invocation of the extension authorization method. If the incoming message is of a type that associates with a built-in authorization method, at step 336, processing is passed to the authorizer 214 for executing the specified built-in authorization method.

At step 338, the credential authorization 210 determines the result of the authorization method, whether it is built-in or extension. If the authorization has failed to authorize privileges required for the application message type for the identity for whatever reason, processing is passed to step 318 for error handling. Else if the user identity associated with user credentials has been successfully authorized for the privileges required for the application message type, the authentication and authorization logic passes the message at step 308 to a logic in the network infrastructure element 110A for further processing such as forwarding the message towards its intended destination.

3.0 AONS Implementation Examples
3.1 AONS General Overview

In an embodiment, AONS comprises a set of software modules hosted on a network infrastructure element, such as a router or switch, that can identify application messages from packet flows, perform operations on the applications messages, and perform application functions on behalf of applications, clients and servers. Examples of operations and functions include format transformation; payload changes based on policy; performing load-balancing decisions; sending messages to monitoring stations; and creating log entries, notifications and alerts according to rules. AONS complements existing networking technologies by providing a greater degree of awareness of what information is flowing within the network and helping users to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS integrates with network-layer support to provide a more holistic approach to information flow and management, mapping required features at the application layer into low-level networking features implemented by routers, switches, firewalls and other networking systems. In an embodiment, a data processing unit ("blade") in a router or switch hosts and executes one or more AONS software modules ("bladelets") to implement the functions herein.

3.2 Multi-Blade Architecture

According to one embodiment, an AONS blade in a router or a switch performs the actions discussed herein.

Figure 4:
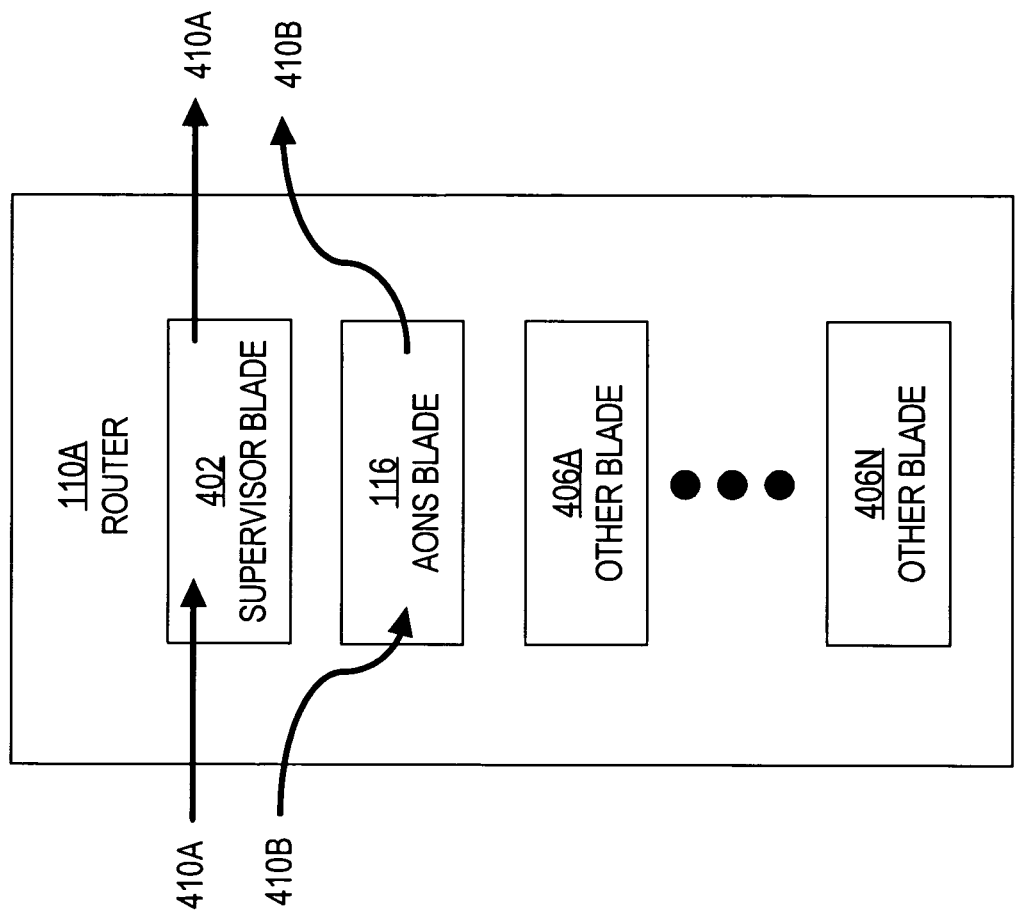
FIG. 4 is a block diagram that illustrates one embodiment of a router in which a supervisor blade directs some packet flows to an AONS blade and/or other blades.

FIG. 4 is a block diagram that illustrates one embodiment of a router 110A in which a supervisor blade 402 directs some of packet flows 410A-B to an AONS blade and/or other blades 406A-N. Router 110A comprises supervisor blade 402, AONS blade 116, and other blades 406A-N. Each of blades 402, 116, and 406A-N is a single circuit board populated with components such as processors, memory, and network connections that are usually found on multiple boards. Blades 402, 116, and 406A-N are designed to be addable to and removable from router 110A. The functionality of router 110A is determined by the functionality of the blades therein. Adding blades to router 110A can augment the functionality of router 110A, but router 110A can provide a lesser degree of functionality with fewer blades at a lesser cost if desired. One or more of the blades may be optional.

Router 110A receives packet flows such as packet flows 410A-B. More specifically, packet flows 410A-B received by router 110A are received by supervisor blade 402. Supervisor blade 402 may comprise a forwarding engine and/or a route processor such as those commercially available from Cisco Systems, Inc.

In one embodiment, supervisor blade 402 classifies packet flows 410A-B based on one or more parameters contained in the packets of those packet flows. If the parameters match specified parameters, then supervisor blade 402 sends the packets to a specified one of AONS blade 116 and/or other blades 406A-N. Alternatively, if the parameters do not match any specified parameters, then supervisor blade 402 performs routing functions relative to the particular packet and forwards the particular packet on toward the particular packet's destination.

For example, supervisor blade 402 may determine that packets in packet flow 410B match specified parameters. Consequently, supervisor blade 402 may send packets in packet flow 410B to AONS blade 116. Supervisor blade 402 may receive packets back from AONS blade 116 and/or other blades 406A-N and send the packets on to the next hop in a network path that leads to those packets' destination. For another example, supervisor blade 402 may determine that packets in packet flow 410A do not match any specified parameters. Consequently, without sending any packets in packet flow 410A to AONS blade 116 or other blades 406A-N, supervisor blade 402 may send packets in packet flow 410A on to the next hop in a network path that leads to those packets' destination.

AONS blade 116 and other blades 406A-N receive packets from supervisor blade 402, perform operations relative to the packets, and return the packets to supervisor blade 402. Supervisor blade 402 may send packets to and receive packets from multiple blades before sending those packets out of router 110A. For example, supervisor blade 402 may send a particular group of packets to other blade 406A. Other blade 406A may perform firewall functions relative to the packets and send the packets back to supervisor blade 402. Supervisor blade 402 may receive the packet from other blade 406A and send the packets to AONS blade 116. AONS blade 116 may perform one or more message payload-based operations relative to the packets and send the packets back to supervisor blade 402.

3.3 AONS Blade Message Processing Framework

Figure 5:
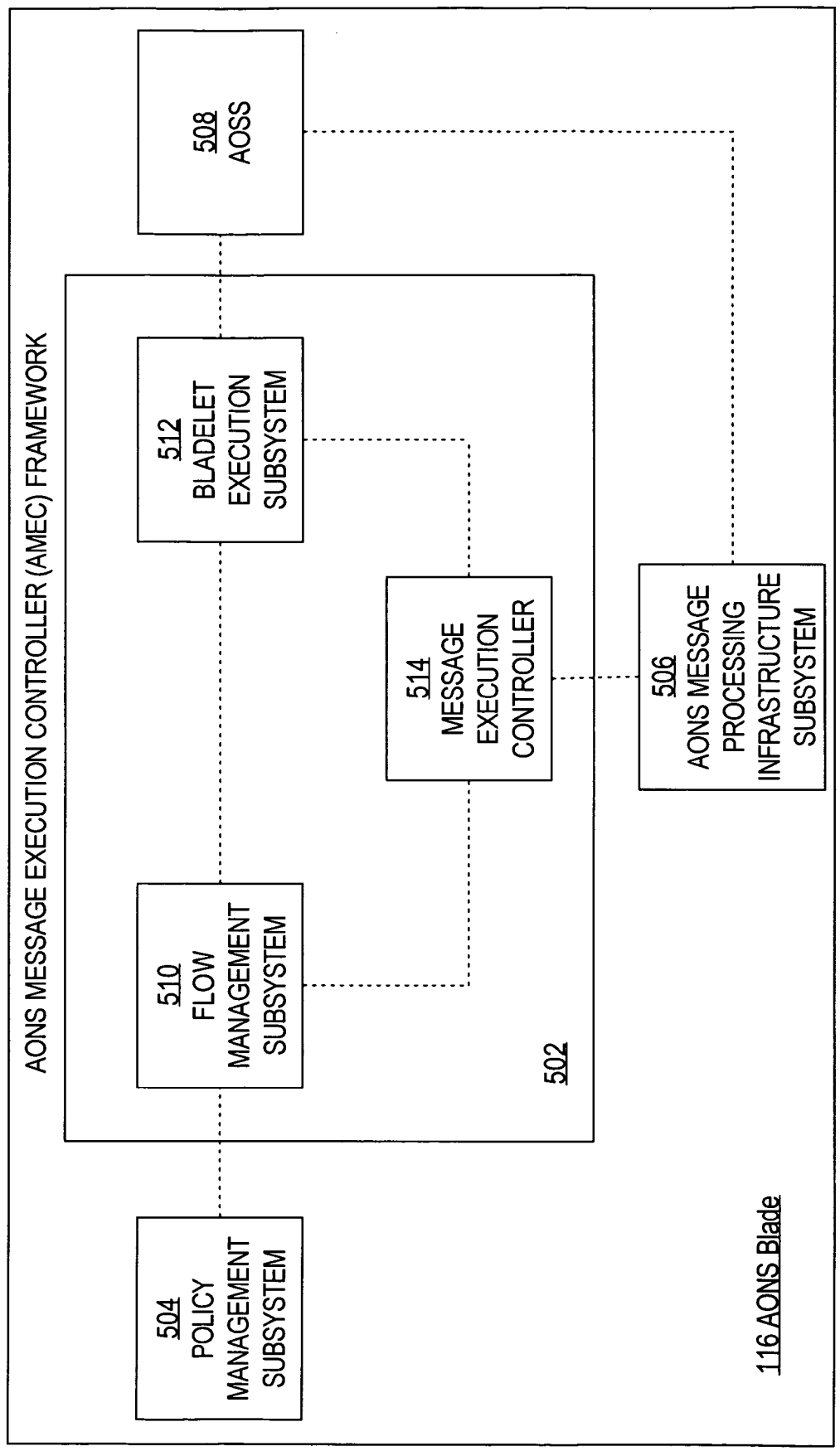
FIG. 5 is a diagram that illustrates message-processing modules within an AONS node.

FIG. 5 is a diagram that illustrates message-processing modules within an AONS blade 116. AONS blade 116 comprises an AONS message execution controller (AMEC) framework 502, a policy management subsystem 504, an AONS message processing infrastructure subsystem 506, and an AOSS 508. AMEC framework 502 comprises a flow management subsystem 510, a bladelet execution subsystem 512, and a message execution controller 514. Policy management subsystem 504 communicates with flow management subsystem 510. AOSS 508 communicates with bladelet execution subsystem 512 and AONS message processing infrastructure subsystem 506. AONS message processing infrastructure subsystem 506 communicates with message execution controller 514. Flow management subsystem 510, bladelet execution subsystem, and message execution controller 514 all communicate with each other.

Figure 6:
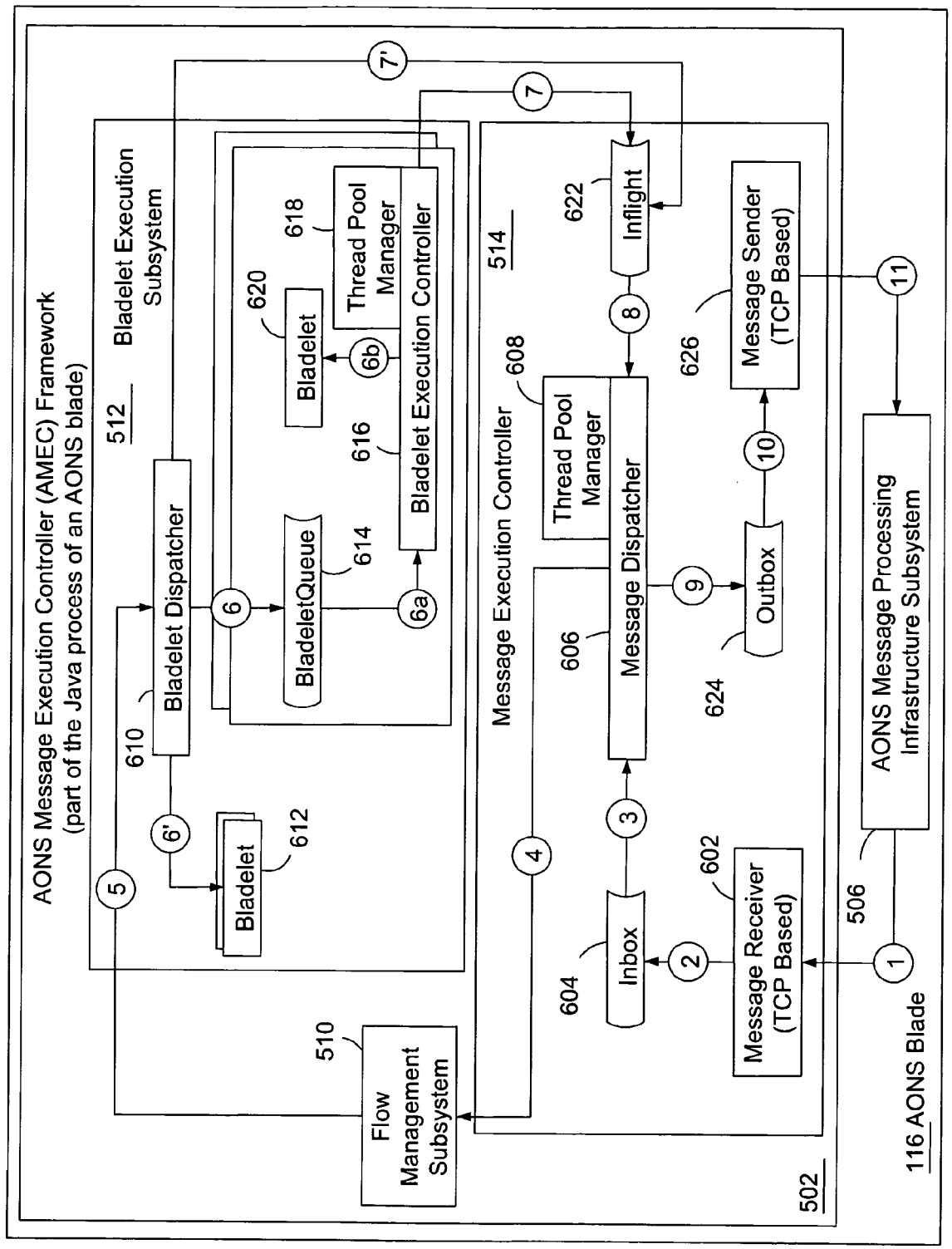
FIG. 6 is a diagram that illustrates message processing within AONS node.

FIG. 6 is a diagram that illustrates message processing within AONS blade 116. AMEC framework 602 is an event-based multi-threaded mechanism to maximize throughput while minimizing latency for messages in the AONS blade. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 602.

In one embodiment, executing the flow comprises executing each step (i.e., bladelet/action) of the flow. If a bladelet is to be run within a separate context, then AMEC framework 602 may enqueue into bladelet-specific queues, and, based on thread availability, dequeue appropriate bladelet states from each bladelet queue.

3.4 Extension Package Implementation

In one embodiment, the following tools are provided for creating extension package for authentication and authorization in an AONS node: a custom bladelet software development kit (hereinafter "Custom Bladelet SDK"), a design studio, or ADS, and an admin tool, or AMC, all commercially available from Cisco Systems, Inc. A designer uses Cisco Custom Bladelet SDK, java editor, or other third party tools to write Java code that will provide bladelet functionality. ADS is a visual tool for designing flows and applying message classification and mapping policies. AMC is a web-based interface to perform all administration and configuration functions.

Figure 7:
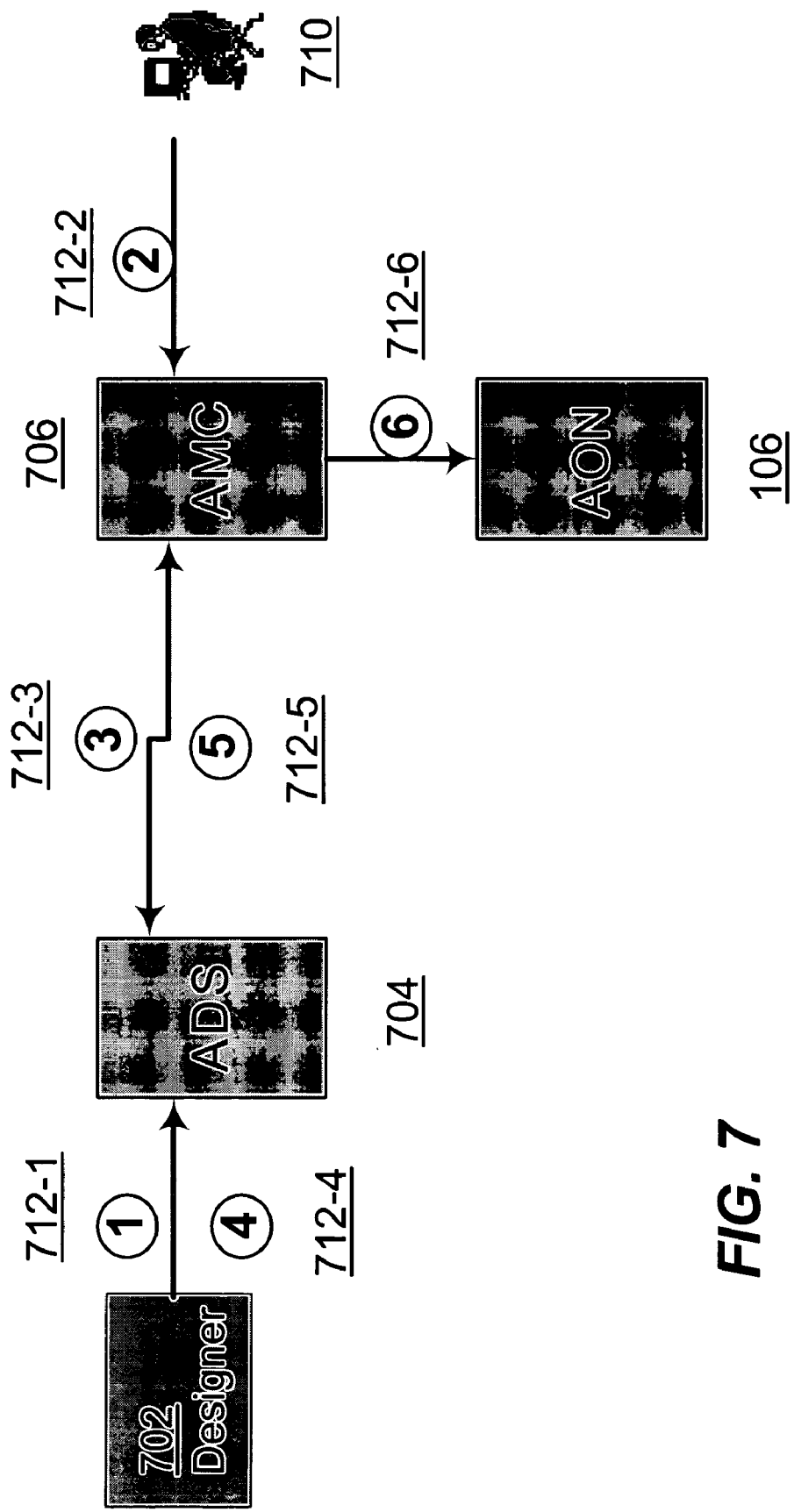
FIG. 7 is a flow diagram of how an authentication and/or authentication package is created and provisioned to an AONS blade, in one embodiment.

FIG. 7 is a flow diagram of how an authentication and/or authentication package is created and provisioned to an AONS blade, in one embodiment. In one embodiment, designer 702 develops new custom bladelet classes to support an extension authentication/authorization method by extending bladelet classes provided in Cisco Custom Bladelet SDK and implementing an authentication and authorization APIs. Table 1 identifies example JAVA classes and methods that can be used in an implementation.

TABLE 1

| AUTHENTICATION AND AUTHORIZATION API | | |
|---|---|---|
| Method | Description | Return Type |
| AAHandlerFactory This interface defines an Authentication/Authorization Handler Factory object. This is implemented by an Authentication and Authorization Extension that intends to extend authentication and authorization function in AON. Class name in Authentication and Authorization Extension Package that implements this interface is specified in Authentication and Authorization Extension Meta Info. | | |
| createHandler | This method creates an AAHandler object. This method must be implemented by extensions in a thread safe manner. | AAHandler |
| AAHandler This interface defines methods for authentication and authorization function. Objects that implement this interface are created by AAHandlerFactory. The authentication and authorization logic 108 invokes AAHandlerFactory and creates AAHandler objects. These objects are then used to handle authenticate and authorize requests made by respective bladelets when corresponding extension is selected in the bladelet. | | |
| Authenticate | This method performs authentication. It takes a collection of parameters (name/value pairs) that defines an execution context. It contains all the configuration parameters specified in extension configuration in the bladelet. | AuthenticationResult |

TABLE 1-continued

AUTHENTICATION AND AUTHORIZATION API

| Method | Description | Return Type |
|---|---|---|
| Authorize | This method performs authorization. It takes a collection of parameters (name/value pairs) that defines an execution context. It contains all the configuration parameters from extension configuration in authorization bladelet. | AuthorizationResult |
| | AuthenticationResult<br>This class defines result of authentication operation. It contains result code and a collection of attribute values provided by the authenticator. | |
| getResultCode | This method returns the result code of the authentication result. If the result code is AUTHC_SUCCESS it indicates authentication success and if it is AUTHC_FAILURE it indicates authentication failure. | Integer |
| getAttributes | This method returns a collection of attribute value pairs returned as a result of authentication. This can provides attributes which are specific to extension implementation and may or may not be used by AON. It can also return attributes that AON may request the extension to provide if the operation results in authentication success. One example of this could be an authenticator may supply a mapped identity of the user being authenticated. Another example could be an option if the result of authentication can be cached and if so for how long a duration they can be cached. These attribute names/values that AON can handle will be documented as required. | HashMap |
| | AuthorizationResult<br>This class defines result of authorization operation. It contains result code and a collection of values provided by the authorizer. | |
| getResultCode | This method returns the result code of the authorization result. If the result code is AUTHZ_PERMIT it indicates access requested is permitted and if it is AUTHZ_DENIED it indicates access requested is denied. | Integer |
| getAttributes | This method returns a collection of attribute value pairs returned as a result of authorization. An example of an attribute value can be if operation failed the reason for failure, or if the authorization is denied then explanation of access denial. These attribute names/values that AON can handle will be documented as required. | HashMap |

At step 712-1, the designer 702 interacts with ADS 704 and creates an authentication/authorization extension package. As a part of creating the package, the designer 702 provides a number of artifacts. First, the designer 702 provides one or more JAVA *.jar files implementing an extended authentication method and necessary libraries. For example, in case of a SiteMinder extension, the designer 702 provides the jar files implementing a SiteMinder Java Agent functionality and a number of library files referenced directly or indirectly by the SiteMinder Java Agent such as smjavaagentapijar, smjavasdk2.jar, libsmagentapi.so and libsmjavaagentapi.so for SiteMinder Release 5.5, commercially available from CA.

Additionally, the designer 702 provides bladelet extension info XML files for the custom bladelets, using bladelet extension info schema defined in Cisco Custom Bladelet SDK. Table 2 shows an example bladelet extension info XML file for SiteMinder authentication that can be used in an implementation.

TABLE 2

AN EXAMPLE BLADELET EXTENSION INFO XML FILE

```
<plugin displayNameKey="aaext.siteminder"
        id="com.cisco.aons.security.aaext.SMAAExtPlugin"
        version="1.0"
        provider-name="Cisco System, Inc."
        pluginClass="com.cisco.aons.security.aaext.SMAAExtension"
        bundle="com.cisco.aons.security.aaext.SMAAExtProperties">
    <extension point="Authentication:1.ext_config_type"
            extClass="com.cisco.aons.security.aaext.SMAAHandlerFactory"
            extValidationClass="com.cisco.aons.security.aaext.validator.SMAAValidator"
            displayNameKey="aaext.siteminder"
            id="SMAuthentication">
        <designSpec>
        <extParams>
            <extParam id="1">
                <configuration-group name="ConfigurationType"
                    key="cg.authnscheme"
                value="extension" valueKey="cg.authnscheme.extension"
                type="radio">
                <configuration-subgroup>
                    <parameter-group name="ExtensionSubjectSource"
                    key="cg.authnscheme.extension.pg.source">
                    <parameter name="ExtensionSubject"
                        designName="extension.source.input"
                        key="cg.authnscheme.extension.pg.source.p.input"
                        type="AONSSubject" allowUserInput="false"/>
                    </parameter-group>
                    <parameter-group name="ExtensionConfiguration"
                    key="cg.authnscheme.extension.pg.configuration">
                    <parameter name="ExtensionResource"
                        designName="extension.configuration.resource"
                        key="cg.authnscheme.extension.pg.extensionconfiguration.p.resource"
                        type="string" allowUserInput="true"
                        allowVarBinding="true"/>
                    <parameter name="Profile"
                        designName="extension.configuration.profile"
                        key="cg.authnscheme.extension.pg.configuration.p.profile"
                        type="policy" allowUserInput="false"
                        allowVarBinding="false"
                        domain="com.cisco.aons.policies.security.NeteSiteMinderInfo">
                    </parameter>
                    </parameter-group>
                </configuration-subgroup>
            </extParam>
        </extParams>
        </designSpec>
    </extension>
</plugin>
```

The designer 702 further provides parameters that are needed to perform the extension authentication and authorization method. The parameters may be defined by an attribute domain. Table 3 shows an example attribute domain for SiteMinder authentication that can be used in an implementation.

TABLE 3

EXAMPLE ATTRIBUTE DOMAIN

| No | Parameter/ Property | Description |
|---|---|---|
| 1 | Access Server | Specifies IP Address of SiteMinder Policy Server. |
| 2 | Agent Name | Name of Web Agent configured in the Policy Server. |
| 3 | Agent Secret | Password or secret for the agent. This is needed to connect to the agent object in Policy Server. |
| 4 | Minimum no of connection | Agent API object is initialized with minimum no of connections. It creates these connections to SM Policy Server when it is initialized. |
| 5 | Maximum no of connection | Indicates the maximum no of connections Agent API will create. |
| 6 | Connection Step | Indicates the number by which connections are increased if Agent API needs to increase number of connections to SM Policy Server. Total number of connections does not exceed the value specified in 5. |
| 7 | Connection Timeout in seconds | This value is used as a timeout when any authentication or authorization call is made on Agent API object. |
| 8 | Authentication Port | Indicates the value of authentication port configured on SM Policy Server. SM 5.5 Policy Server can configure a specific port value to use for authentication service. For SM 6.0 default can be used. |
| 9 | Authorization Port | Indicates the value of authorization port configured on SM Policy Server. SM 5.5 Policy Server can configure a specific port value to use for authorization service. For SM 6.0 default can be used. |
| 10 | Accounting Port | Indicates the value of accounting port configured on SM Policy Server. SM 5.5 Policy |

TABLE 3-continued

EXAMPLE ATTRIBUTE DOMAIN

| No | Parameter/ Property | Description |
|---|---|---|
| | | Server can configure a specific port value to use for accounting service. For SM 6.0 default can be used. |
| 11 | Failover SM Policy Server Address | Specifies IP Address of Failover SM Policy Server to use. |

Note:
Properties in rows 4, 5, 6, 7, 8, 9, 10 are provided for Failover SM Policy Server also.

In one embodiment, the authentication/authorization extension package created with the above artifacts is saved as a bar file on a disk.

At step 712-2, an administrator 710 uploads and registers the authentication/authorization extension package to AMC 706. Once loaded and registered, the authentication/authorization extension package is available for use in ADS.

At step 712-3, the designer 702 causes ADS 704 to synchronize with AMC 706 to retrieve the authentication/authorization extension package which has been enabled and made available by the AMC uploading and registering step 712-2.

At step 712-4, the designer 702 continues his or her designing tasks of defining message flows between bladelets, message types, user credential location definitions, and any associations of user credential location definitions with the message types.

At step 712-5, the administrator 710 causes AMC 706 to synchronize with ADS 704 to retrieve the flows, message types, user credential location definitions, and associations defined in step 712-4.

At step 712-6, the administrator 710 deploys to an AON blade 106 the extension package, and a policy comprising of the message flows, message types, user credential location definitions and associations of the user credential location definitions with the message types, and enable the AON blade 106 to use the authentication/authorization method available in the extension package.

4.0 Controlling Computer Program Extensions in a Network Device

Embodiments of an approach for controlling computer program extensions in a network device are now described with reference to FIG. 9 through FIG. 12B inclusive. As background, AON devices from Cisco Systems, Inc. are believed to be the first programmable network devices in which program code can be dynamically uploaded to a running network device to extend the functionality available on the network device. In an embodiment, techniques are provided to protect the network device against deployment of malicious code on the device that results in disrupting or preventing the normal behavior of the network device.

In an embodiment, a control module is implemented as a Java® program that controls security of the network device and ensures that the appropriate permissions are available. In this context, a "permission" is a specific action that designated program code is allowed to perform. Various embodiments improve upon the JVM security implementation in several ways. In one embodiment, the control module does not require the JVM to be restarted when new code is deployed to the network device for execution on the JVM, and the when the new code is subject to different security policies. Other embodiments may be used with C, C++, or other language environments.

In an embodiment, the control module is configured using a novel XML-based descriptor file that simplifies the editing and maintenance of the standard JVM security policy file. In an embodiment, the control module allows multiple security policy files to be active in the JVM for multiple different code sources. In contrast, a standard JVM implementation only allows a single security policy file.

In an embodiment, the control process implements an inheritance mechanism that can be overridden by each code source. The control module determines which permissions can be overridden and which permissions cannot have an override. For example, the Java® call System.exit( ) cannot be overridden by newly deployed code. However, the ability to write to the local filesystem is disabled by default, but the default write permission can be overridden to allow writing to the filesystem.

In an embodiment, security policy is expressed as restrictions or permissions. In conventional Java security approaches, resources must be granted explicit access when a security policy is in effect. For example, if a user needs to restrict access to the /usr/temp directory on a filesystem, then the Java security policy schema requires the user to explicitly grant access to all subdirectories in the /usr directory. The restriction on /usr/temp is enforced by the fact that permissions have not explicitly been granted to that directory. In contrast, in an embodiment herein, the user can restrict access to /usr/temp by adding a new permission type to the Java security policy schema. In an embodiment, a new control process interacts with the standard Java security manager to enforce restrictions, system default permissions, and user program extension permissions that override system default permissions.

As a result, the approaches herein allow a network administrator or user to provision custom programs into a network device and provide a secure, sandboxed environment in which custom programs can execute without harming the network device. The administrator can determine what external systems or resources a custom program can access and what operations the custom program can perform. The developer of a custom program can specify and apply the security policy for the custom program at runtime, without stopping operation of the network element. The network element does not require a new image. Instead, the program extensions and security policy can be installed by a third-party developer after the network element is deployed. The approaches improve the security mechanism provided by a conventional JVM, and allow security policies to be dynamically created and applied.

Certain embodiments provide significant benefits over prior approaches. For example, embodiments provide a secure environment in which custom programs that are deployed in a network device can execute. An embodiment can provide a data-driven approach to easily customize and extend the security capabilities of the device. An embodiment can provide a language-independent mechanism to express security permissions so that the security can be leveraged regardless of the implementing language. An embodiment can create a programming paradigm and provide a container in which custom code can execute in a secure manner, regardless of the implementing language.

Network equipment manufacturers may use the approaches herein to support dynamic deployment and execution of custom code in a network device.

Figure 9:
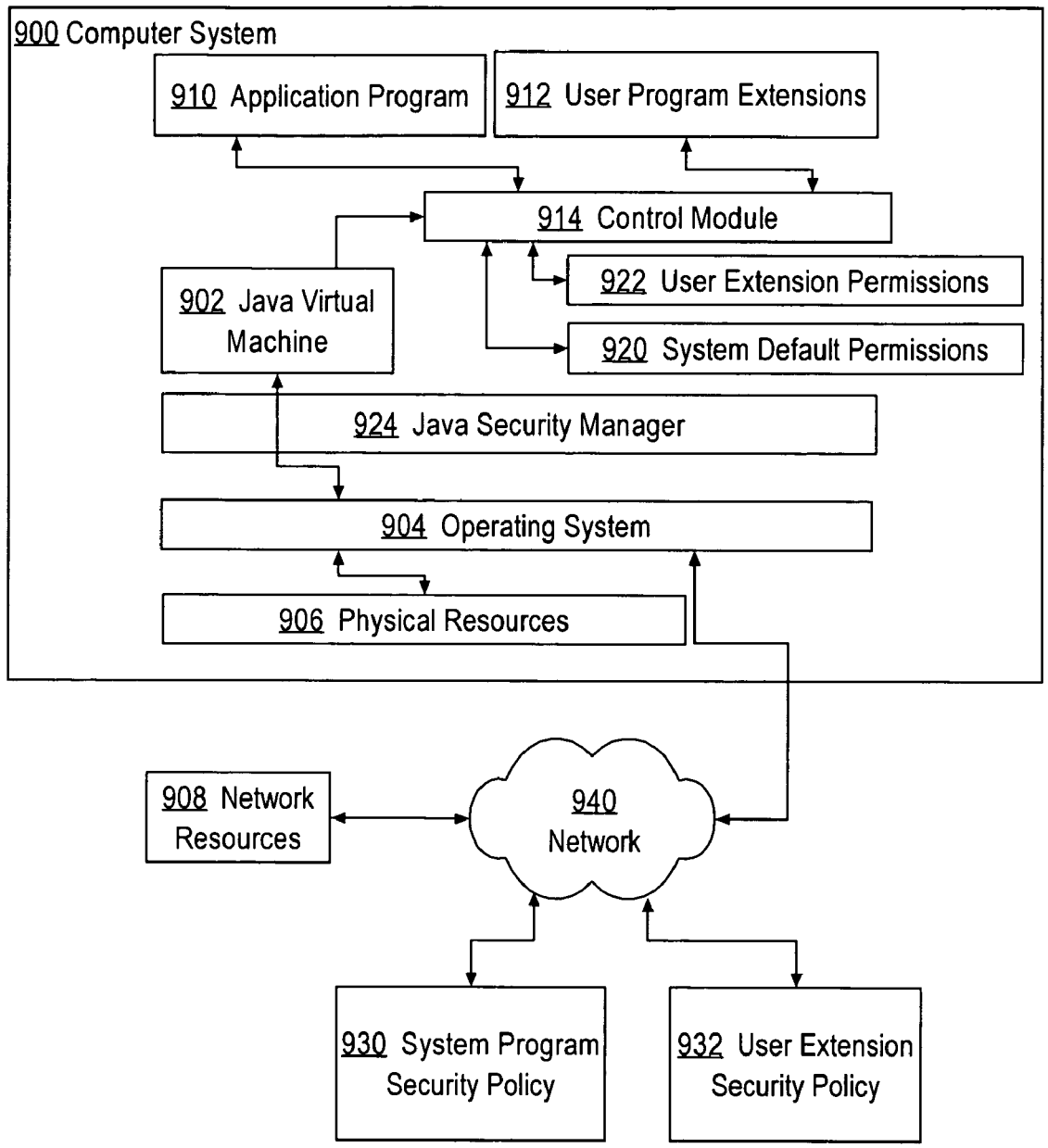
FIG. 9 is a block diagram that shows a computer system with user program extensions.

FIG. 9 is a block diagram that shows a computer system with user program extensions. In FIG. 9, a computer system 900 hosts an application program 910 and one or more user program extensions 912. Computer system 900 comprises, in one embodiment, a network infrastructure element such as a router or switch for a packet-switched network. In an embodiment, computer system 900 comprises a router that hosts an AON blade from Cisco Systems, Inc., San Jose, Calif.

Application program 910 comprises any logic, program code, or other software element that performs a useful function on computer system 900 and is capable of extension by other logic, program code, or other software elements. The user program extensions comprise custom code or other user-defined methods, objects, routines, or other software elements that extend features or functions of application program 910. For example, user program extensions 912 can comprise implementations of methods that are defined in an API of application program 910, new methods to implement functions not found in application program 910, or any other programmatic element. An example of an application program 910 is an authentication process. An example of a user program extension 912 is an authentication method that is not supported in application program 910 when originally deployed.

In an embodiment, a user creates user program extensions 912 separate from computer system 900 and then uploads and installs the extensions to the computer system. Any convenient mechanisms may be used to create, upload and install the extensions.

In an embodiment, application program 910 and user program extensions are coupled to Java Virtual Machine 902. In other embodiments, virtual program execution environments other than a JVM may be used. A control module 914 is coupled to the JVM 902. The control module 914 comprises one or more computer programs or other software elements that implement the functional approaches herein.

System default permissions 920 and user extension permissions 922 are coupled to control module 914. System default permissions 920 represent security restrictions or permissions that apply by default. Typically the system default permissions 920 are provided in the computer system 900 when the computer system is initially deployed or shipped to a customer. Control module 914 may incorporate logic that determines whether any of the system default permissions 920 can be overridden by conflicting user extension permissions 922.

The user extension permissions 922 comprise security restrictions or permissions that have been user-defined and installed after resolving any conflicts with the system default permissions. Thus, the vendor or creator of computer system 900 can provide for a restrictive security policy using system default permissions 920, but can allow the user extension permissions 922 to override the default permissions. The control module 914 informs the JVM 902 about the permissions.

In this context, although the term "permissions" is used herein in reference to FIG. 9 and other embodiments, a security policy may be defined and deployed in terms of restrictions upon program actions rather than permissions to perform program actions. Thus, all instances of the term "permissions" herein include the use of restrictions as an alternative, variation or addition. Further, in the description herein a "policy" is an abstract statement of a security permission or restriction that is created and stored outside a network element, and a "permission" or "restriction" is an embodiment of the policy within the network element that controls whether program actions can access or use specified resources, functions or methods.

Java® security manager 924 comprises static security restrictions that are established at compile time or development time and implemented natively by the JVM 902. Control module 914 can add permissions 920, 922 to Java Security Manager 924 to modify the Java security model. In an embodiment, control module 914 is a Java class that extends Java Security Manager 924. When application program 910 or user program extensions 912 request access to a network resource, Java Security Manager 924 intercepts the request and then requests control module 914 to determine whether permission is allowed. Based on user extension permissions 920, 922, the control module 914 determines whether permission is allowed. Thus, control module 914 acts as an overriding security manager in this context.

Operating system 904 hosts functional components that are shown above the OS in FIG. 9 and controls access to one or more physical resources 906, such as storage devices and I/O devices. Physical resources 906 may include one or more network interfaces to network 940, which may comprise a LAN, WAN, internetwork, or a combination thereof. One or more network resources 908 are coupled to the network 940. Network resources 908 may comprise web sites, FTP sites, server applications, graphic images, printers, servers, or any other documents, systems or processes that are accessible over a network. Embodiments may control resources other than those physical resources 906 and network resources 908 that are enumerated in this paragraph, such as programs, local disk, network storage, etc. Embodiments may control actions performed on resources such as reading, writing, forking new programs, etc.

A system program security policy 930 and one or more user extension security policies 932 may be coupled to network 940 or stored in computer system 900. In one embodiment, policies 930, 932 comprise electronic documents that express security policies in a structured or abstract written format. Generally, security policies associate or map programs, resources that the programs may or may not access, and actions that the programs may or may not perform with respect to the resources. Control module 914 includes logic to parse the policies 930, 932 and install permissions 920, 922 in computer system 900 based on parsing the policies and resolving conflicts among the policies. Processes for performing parsing and conflict resolution are described further below.

The system program security policy 930 typically is created by a vendor or creator of the control module 914 and is not visible to a user of the computer system 900, such as a customer or network administrator. In contrast, a customer or software developer can create and modify the one or more user extension security policies 932. In this approach, the vendor can define the system program security policy 930 in a confidential manner so that the customer's user extension security policy cannot change or override certain permissions. Therefore, certain critical processes of the computer system 900 can be protected. Indeed, in an embodiment, the system program security policy 930 can specify that a user program extension cannot overwrite a file containing the policy 930. In an embodiment, documentation or written records can specify the default restrictions and default permissions so that the customer has knowledge of what it cannot override and what it can override.

For purposes of illustrating a clear example, FIG. 9 shows one user extension security policy 932 and one set of user extension permissions 922. However, other embodiments may use any number of policy documents and permissions.

Figure 10:
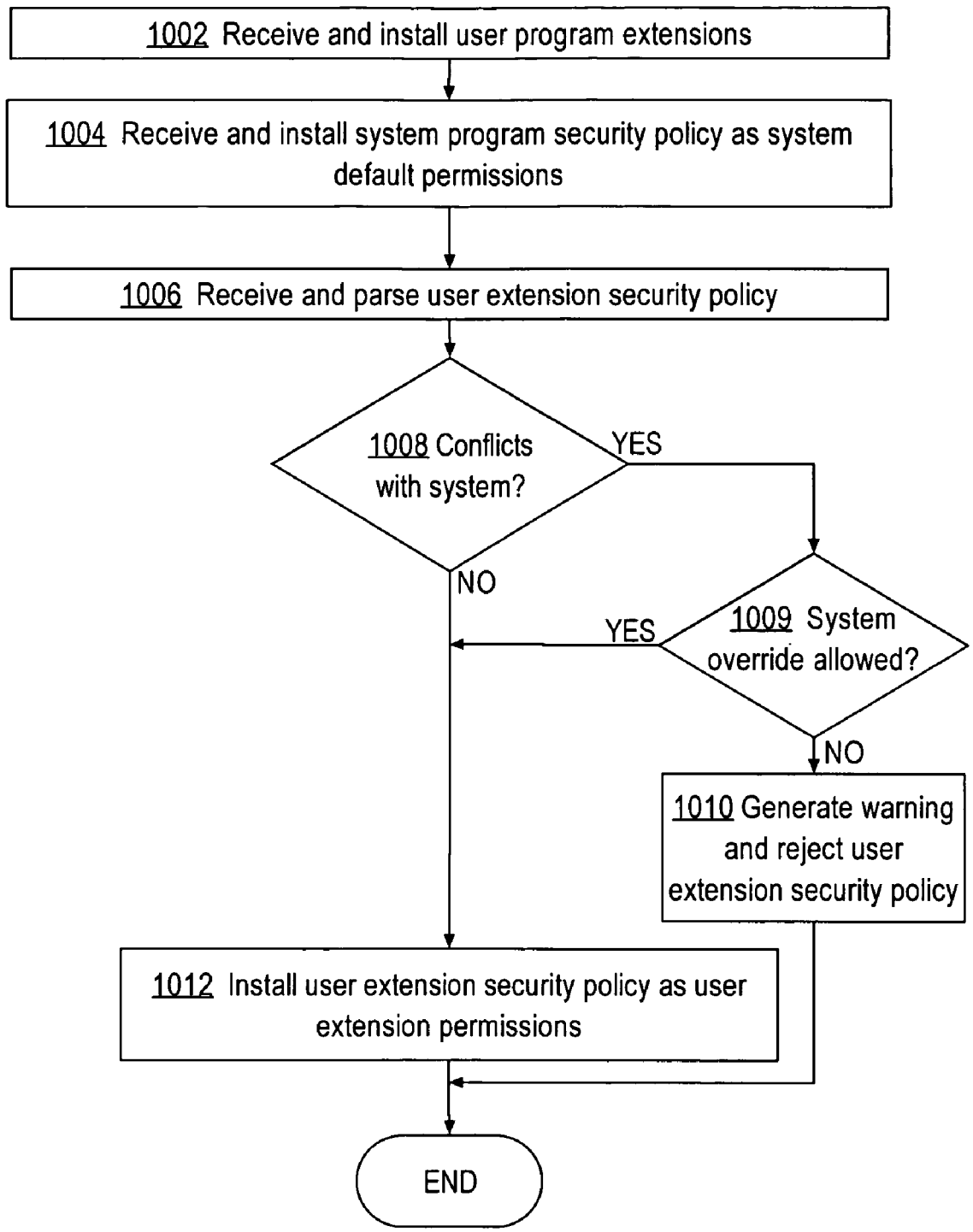
FIG. 10 is a flow diagram of a process of installing a user extension security policy.

FIG. 10 is a flow diagram of a process of installing a user extension security policy. In an embodiment, FIG. 10 is processed at the time that a SCAR file is created or updated.

In step 1002, one or more user program extensions are received and installed. For example, a software developer creates and stores user program extensions 912 in a development computer system, and then uploads the extensions to the computer system 900. The approaches described above for implementing authentication extensions may be used to implement step 1002.

In step 1004, a system program security policy is received and installed as one or more system default permissions. For example, an XML document is received that defines a set of system default security permissions or restrictions. The policy document is parsed, and one or more system default permissions are created and stored in computer system 900.

The default permissions and user extension permissions may be stored in an object model in memory. Thus, in FIG. 9, permissions 920, 922 represent data that has been parsed from the policies 930, 932 and stored in an object model. In an embodiment, permission data may be stored in a cache. In an embodiment, policies 930, 932 are provisioned into permissions 920, 922 using the provisioning approach described above for FIG. 1-8.

Figure 12A:
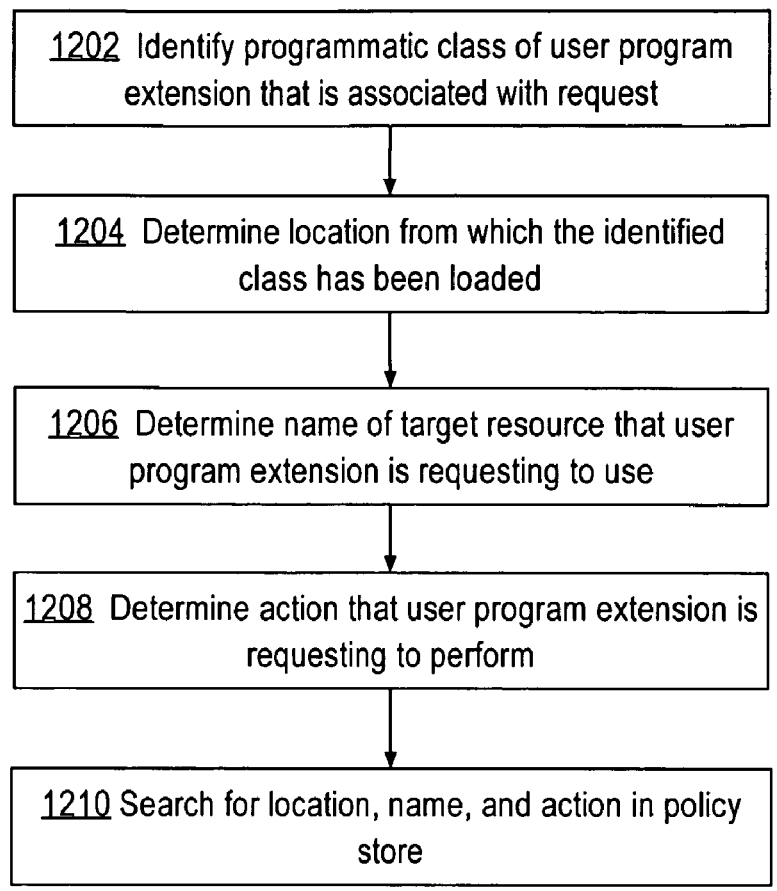
FIG. 12A is a flow diagram of processing user extension security permissions.
Figure 12B:
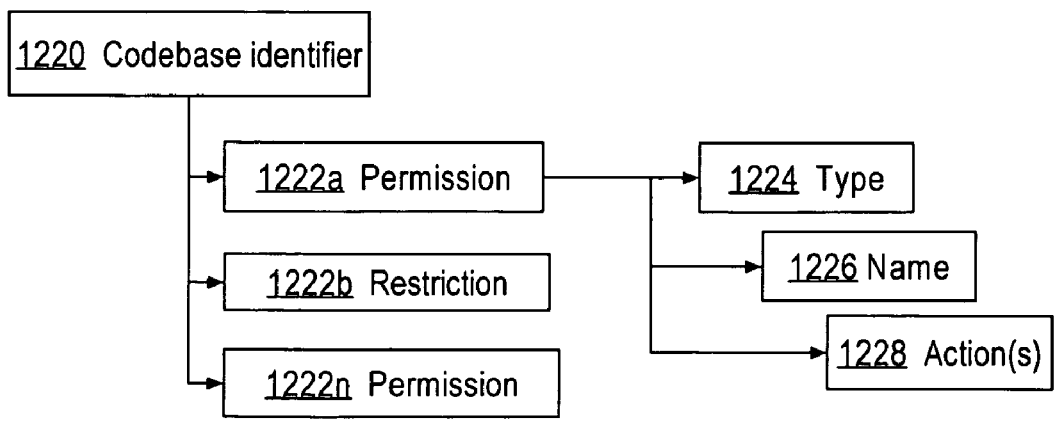
FIG. 12B is a block diagram of elements of a user extension security policy.

FIG. 12B is a block diagram of elements of a user extension security policy that may be used to provide an object model. Permissions state or represent a specific action that designated program code is allowed to perform. In one embodiment, permissions govern access to a file, network resource, socket, property, security object, or runtime object. In another embodiment, permissions govern threads, memory, an administrative console, and CPU use.

As seen in FIG. 12B, a codebase identifier 1220 is associated with one or more permissions or restrictions 1222a, 122b, 122n. Each permission or restriction has a type 1224, name 1226, and actions 1228. Table 4 is an example system default security policy 930 expressed in the form of an XML document:

TABLE 4

EXAMPLE SYSTEM DEFAULT SECURITY POLICY

```
<?xml version = "1.0" encoding = "UTF-8"?>
<policy>
<extension-policy type="aons">
    <grant codebase="file:${java.home}/lib/-">
        <permission>
            <name>java.security.AllPermission</name>
            <target></target>
            <actions></actions>
        </permission>
    </grant>
    <grant codebase="file::${aons.home}/lib/-">
        <permission>
            <name>java.security.AllPermission</name>
        </permission>
    </grant>
    <restrict>
        <permission>
            <name>java.lang.RuntimePermission</name>
            <target>exitVM</target>
            <actions></actions>
        </permission>
    </restrict>
</extension-policy>
</policy>
```

The example policy document comprises a plurality of policies. In general, the policy document specifies which security schema elements an extension program is permitted to override, and which security schema elements an extension program cannot override. The <grant> tags or <restrict> tags delimit each policy.

Each pair of <grant> tags defines a security schema element that an extension program can override, which comprises a codebase declaration and one or more permissions. A codebase declaration specifies a filesystem location from which a program code module could be loaded; thus, the codebase declaration asserts that any program code module loaded from the specified filesystem location is permitted to override the schema element named in the permissions that are described next in the policy document.

The <restrict> tags delimit resources or methods that a user extension program is not permitted to override. Thus, in the example above, the <restrict> tags indicate that a user extension program cannot grant permission to access the "exitVM" Java method. No codebase identifier appears with the <restrict> tags, indicating that the restriction applies to all user extension program code. In one embodiment, restrictions are imposed on: exiting the JVM; creating a Java policy security manager; setting a custom security manager; reflecting permissions; and changing system streams.

Each permission comprises a name, a target, and one or more actions. The name identifies a security schema element that an extension program can override; typically, the name identifies a JVM security schema element. The target identifies one or more methods to which the associated permission applies. The actions specify one or more actions that a program is allowed to perform using the target methods, such as "read," "write," etc.

In step 1006, a user extension security policy is received and parsed. The same parsing, creating and storing process may be used for the user extension security policy as for the system program security policy. Table 5 is an example user extension security policy expressed in an XML document:

TABLE 5

EXAMPLE USER EXTENSION SECURITY POLICY

```
<policy>
<extension-policy type="aons">
    <grant>
        <permission>
            <name>java.lang.RuntimePermission</name>
            <target>exitVM</target>
            <actions></actions>
        </permission>
    </grant>
    <grant codebase="file:{SCRIPTLET}/SAMPLE1/-">
        <permission>
            <name>java.util.PropertyPermission</name>
            <target>*</target>
            <actions>read,write</actions>
        </permission>
    </grant>
    <grant codebase="file:{SCRIPTLET}/SAMPLE1/-">
        <permission>
            <name>java.net.SocketPermission</name>
            <target>mailman.cisco.com</target>
            <actions>connect,resolve</actions>
        </permission>
    </grant>
</extension-policy>
</policy>
```

The example user extension security policy has the same structured format as described above for the example system default security policy, except that a user extension security policy does not contain restrictions, only permissions. Placing a security policy file such as Table 5 in a SCAR file causes all code in the SCAR file to be governed by the override permissions specified in the security policy file, and by the default permissions.

A graphical user interface may be provided to enable creating and editing the policies 930, 932.

As seen from both Table 4 and Table 5, embodiments provide a flexible mechanism for declaring, editing and modifying a security policy of a JVM or other program environment. The use of an XML document with clear, structured tags enables defining a security policy in a manner that is far more understandable than conventional approaches for declaring a JVM security policy using a program configuration file and arcane code declarations.

Further, in conventional Java practice a single security policy is declared using the –d compile-time switch. Only one configuration file containing security policy may be specified in that approach. In contrast, in the approach herein, multiple user program extensions 912 may be created and uploaded at different times, and each of the extensions may define a different user extension security policy 932. For example, a first user extension security policy 932 could override a first default permission and allow a particular program extension to access a particular resource, but a second user extension security policy 932 need not grant permission to access the same resource for a different program extension. Different developers can create the first and second security policy at different times for different user program extensions.

In step 1008, a test is performed to determine whether any permission stated in the user extension security policy conflicts with a system default restriction. Thus, the test of step 1008 determines whether the user extension security policy matches a policy declaration in the system default policy. If so, then step 1009 determines whether the user extension policy is permitted to override the system default policy. Together, steps 1008-1009 determine whether the user extension security policy impermissibly attempts to override a system default security policy. For example, in Table 2 the first permission declaration impermissibly attempts to override the exitVM method, which has been declared in Table 1 as restricted.

If a conflict is found and a system override is not permitted, then in step 1010 a warning is generated and the user extension security policy is rejected. Step 1010 may include any of a variety of warning mechanisms, such as issuing a programmatic exception, sending an error message, event, alert, or other notification, displaying a warning, etc. Rejecting the user extension security policy may comprise not installing only the conflicting user extension permission, rather than rejecting the entire policy document.

If no conflict is found, or a conflict is found by a system override is permitted, then in step 1012 the user extension security policy is installed as one or more user extension permissions. Using this approach, the program security schema of a system such as computer system 900 can be selectively extended by user action without introducing harmful, careless or dangerous extensions of permissions.

Figure 11:
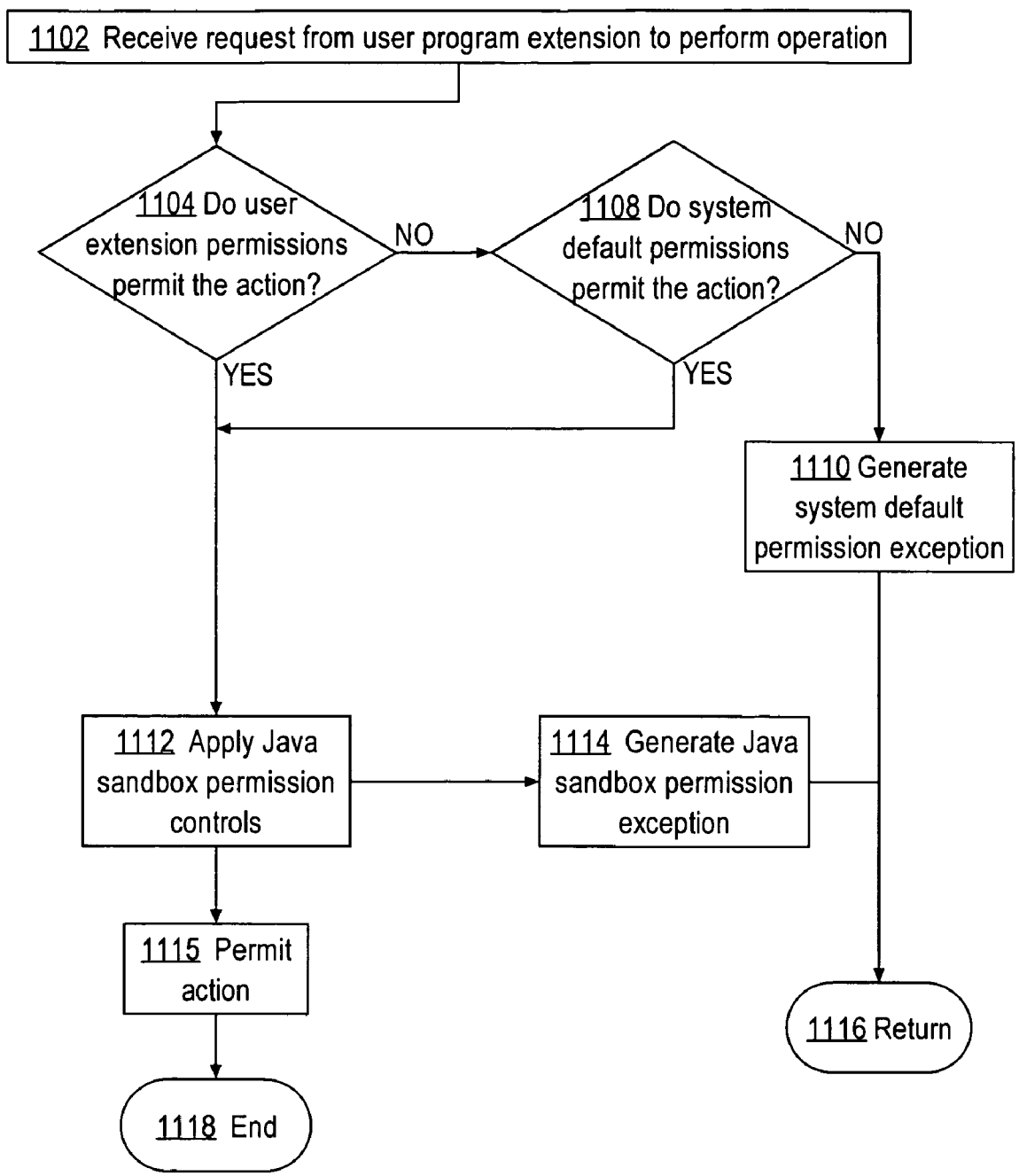
FIG. 11 is a flow diagram of processing default and user extension permissions.

Once user extension permissions are installed, the extensions may be used to govern how extensions to application programs are allowed to access system resources and network resources. FIG. 11 is a flow diagram of processing default and user extension permissions. In step 1102, a request is received from a user program extension to perform an operation. The request may comprise a programmatic request to read a file, write a file, open a resource, etc. The request may comprise any mode or mechanism for attempting to obtain access to any form of computer resource.

Step 1104 tests whether the requested action is permitted according to any of the installed user extension permissions. In an embodiment, user extension permissions are stored in a policy store of the computer system, and step 1104 involves locating a matching permission based on the program request and determining if a matching action is specified in the permission. FIG. 12A, described further herein, is one example of how to identify related user extension permissions.

If step 1104 is affirmative, then in step 1112 one or more conventional Java® sandbox permission controls are applied. Thus, step 1112 represents one example implementation in which a Java application executes using the JVM, and the JVM enforces standard Java sandbox controls. If enforcement of Java sandbox controls yields an error, then an exception is generated at step 1114. If no error occurs, then in step 1115 the requested action is permitted and control ends at step 1118. Permitting a requested action may involve permitting access to a programmatic method, subroutine, or other software element, or permitting use or access to a system resource or network resource.

If step 1104 is negative, then step 1108 tests whether the system default permissions permit the action. If so, then control proceeds to step 1112 as described above. If the system default permissions do not permit the requested action, then in an embodiment the action is inherently restricted, and a system default permission exception is generated at step 1110. Step 1110 may involve generating an error message, exception message, or any other form of event, alert or notification. After an exception, control returns to a calling process or program at step 1116.

Alternatively, actions may be permitted by default unless the system default policy specifies restrictions.

FIG. 12A is a flow diagram of processing user extension security permissions. The process of FIG. 12A may be used to identify which user extension security permissions relate to a particular programmatic request. Step 1202 identifies a programmatic class of a user program extension that is associated with a request. For example, the name of a class, object or method involved in a request is determined.

Step 1204 determines a location from which the identified class has been loaded. For example, the classpath of the class of step 1202 is determined.

Step 1206 determines the name of a target resource that the user program extension is requesting to use. The target resource may comprise a method, object, system resource, or network resource. Step 1208 determines what action the user program extension is requesting to perform. Example actions including reading, writing, connecting, resolving, etc.

Step 1210 searches a policy store based on the location, name, and action that have been determined. For example, step 1210 involves matching the location, name, and action specified in a request of a method of a user program extension to key fields in a policy store that hold corresponding locations, names, and actions of installed permissions. As a result, a matching permission may be found. A similar process may be used to locate a matching restriction.

Figure 13:
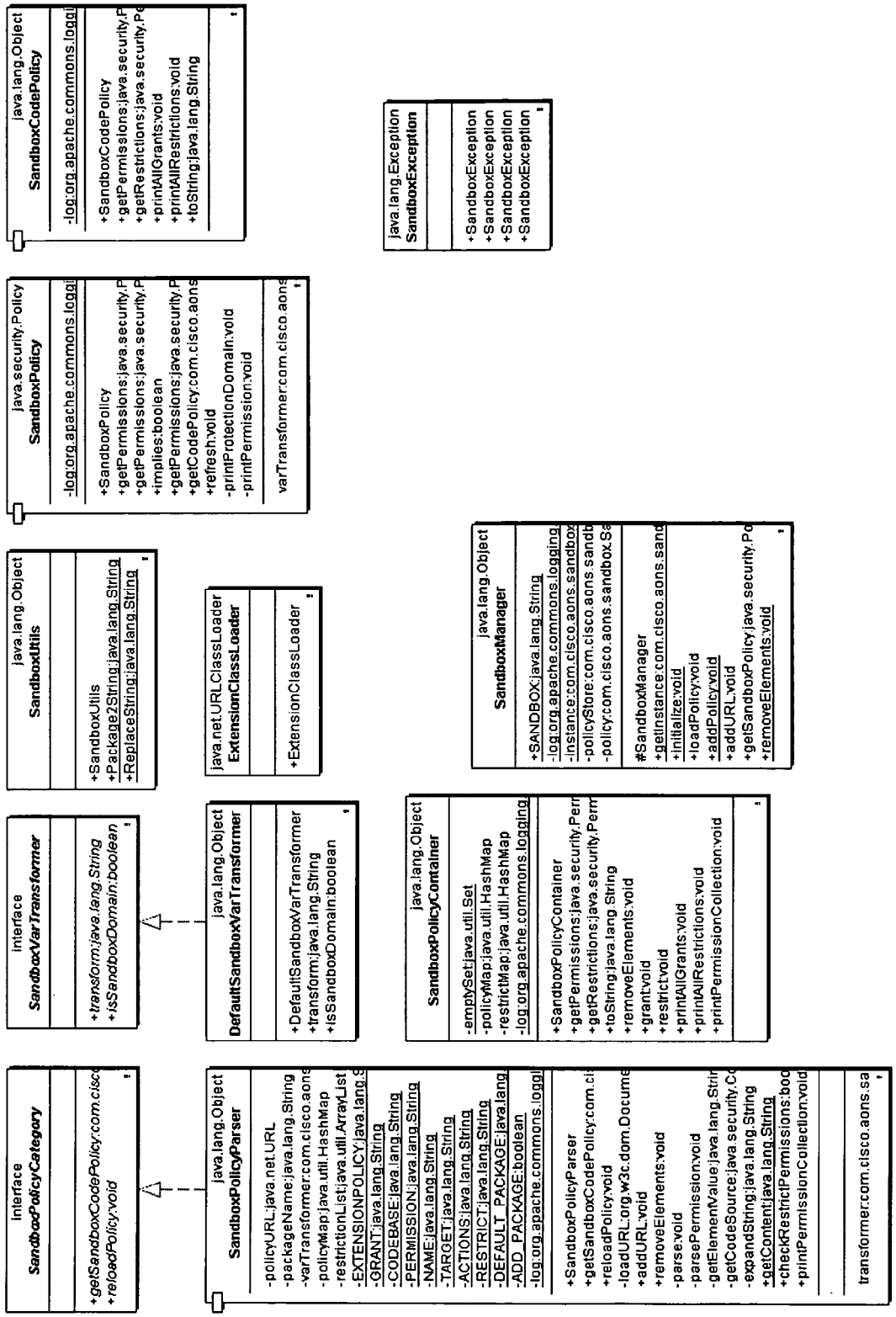
FIG. 13 is a class diagram of programmatic classes that may be used in an implementation.

FIG. 13 is a class diagram of programmatic classes that may be used in an implementation of the structure and functions described herein, using an object-oriented programming environment such as Java.

5.0 Implementation Mechanisms—Hardware Overview

Figure 8:
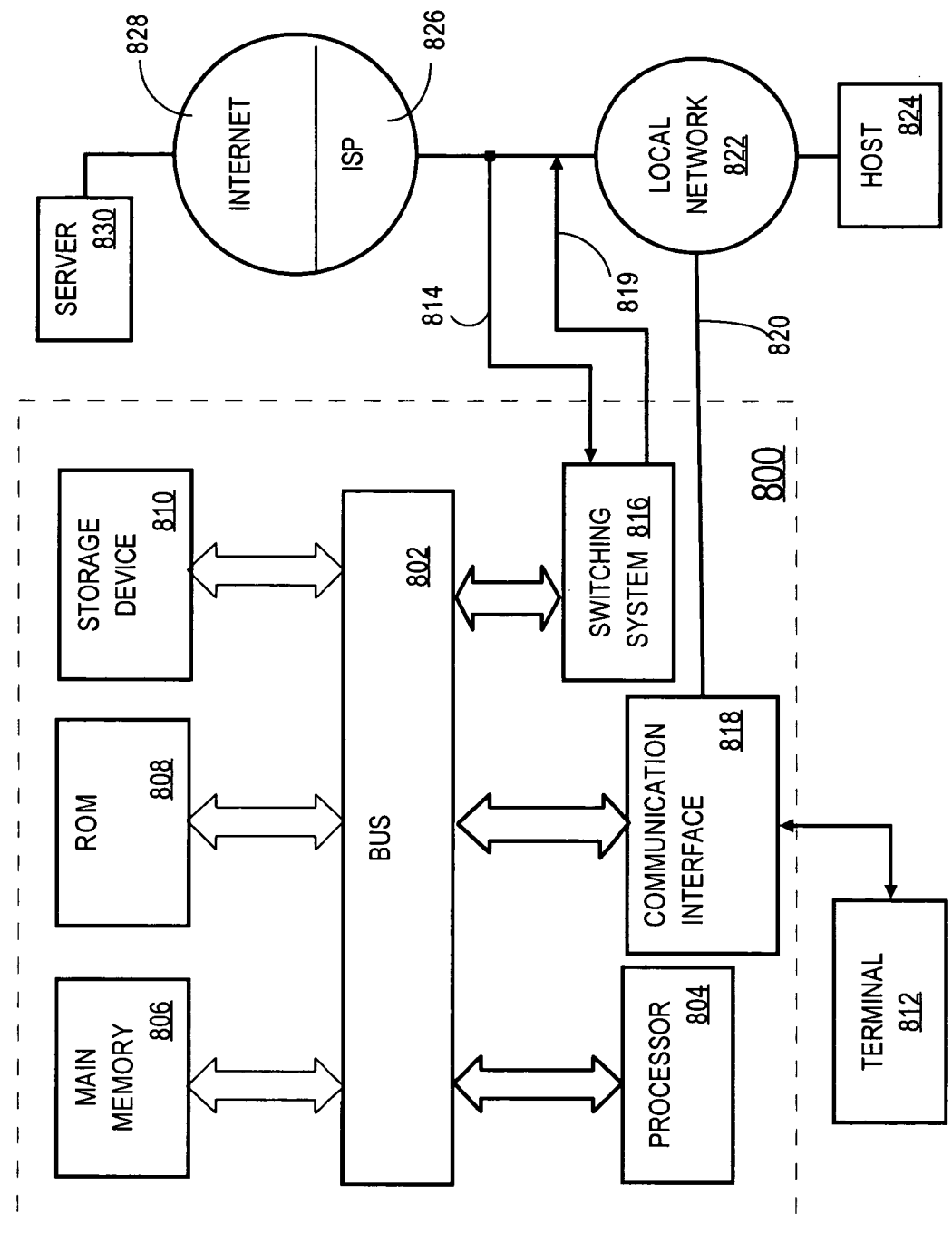
FIG. 8 is a block diagram that illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for extensible authentication and authorization in a network infrastructure element. According to one embodiment of the invention, extensible authentication and authorization in a network infrastructure element is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for extensible authentication and authorization in a network infrastructure element as described herein.

The received code may be executed by processor 804 as it is received, and/or stored in storage device 810, or other non-volatile storage for later execution. In this manner, computer system 800 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a computer-readable storage medium having stored thereon an application program and one or more user program extensions to the application program;
logic comprising one or more stored sequences of instructions which, when executed by the one or more processors, cause the one or more processors to perform;
creating and storing one or more default program security permissions;
receiving a user-defined security policy that defines one or more user extension security permissions for the one or more user program extensions;
wherein the one or more user extension security permissions are different from the one or more default program security permissions;
testing whether each of the one or more user extension security permissions defined by a user conflicts with the default program security permissions;
creating and storing only each of the one or more user extension security permissions that does not conflict with the default program security permissions;
receiving a request from one of the user program extensions to access a resource of the apparatus or the network;
permitting the request to access the resource or the network only when the access does not violate the user extension security permissions and the default program security permissions;
wherein the user-defined security policy comprises one or more extensible markup language (XML) documents each comprising one or more permission definitions each comprising a permission type, permission name, and one or more actions, and wherein each of the permission definitions is associated in the user-defined security policy with a codebase identifier.

2. The apparatus of claim 1, comprising a router or switch for a packet-switched network.

3. The apparatus of claim 1, wherein the logic further comprises instructions which when executed cause permitting the request to access the resource or the network only when the access also does not violate Java® sandbox security permissions.

4. The apparatus of claim 1, wherein the logic further comprises sequences of instructions which, when executed by the processor, cause the one or more processors to perform creating and storing only each of the one or more user extension security permissions that do not conflict with the default program security permissions, except when the logic specifies that the user extension security permissions can override the default program security permissions.

5. The apparatus of claim 1, wherein the logic further comprises sequences of instructions which, when executed by the processor, cause the processor to perform parsing the user-defined security policy by:
storing the permission type, permission name, actions, and codebase identifier in a policy store;
identifying a programmatic class of the user program extension that is associated with the request;
determining a location from which the identified class has been loaded;
determining a name of the resource from the request;
determining an action associated with the request;
searching the policy store for the location, name and action based on comparing the identified class to stored codebase identifiers.

6. The apparatus of claim 1, wherein the logic further comprises sequences of instructions which, when executed by the processor, cause the processor to perform:
first determining whether the request violates the user extension security permissions and generating a user extension permission exception when a violation is determined;
then determining whether the request violates the default program security permissions and generating a user extension permission exception when a violation is determined.

7. A machine-implemented method, comprising:
creating and storing one or more default program security permissions in a network infrastructure device that is coupled to a network and that hosts an application program and one or more user program extensions to the application program;
receiving a user-defined security policy that defines one or more user extension security permissions for the one or more user program extensions;
wherein the one or more user extension security permissions are different from the one or more default program security permissions;
testing whether each of the one or more user extension security permissions defined by a user conflicts with the default program security permissions;
creating and storing only each of the one or more user extension security permissions that does not conflict with the default program security permissions;
receiving in the network infrastructure device a request from one of the user program extensions to access a resource of the apparatus or the network;
permitting the request to access the resource or the network only when the access does not violate the user extension security permissions and the default program security permissions;
wherein the method is performed by one or more processors;
wherein the user-defined security policy comprises one or more extensible markup language (XML) documents each comprising one or more permission definitions each comprising a permission type, permission name, and one or more actions, and wherein each of the permission definitions is associated in the user-defined security policy with a codebase identifier.

8. The method of claim 7, wherein the network infrastructure device comprises a router or switch for a packet-switched network.

9. The method of claim 7, further comprising permitting the request to access the resource or the network only when the access also does not violate Java® sandbox security permissions.

10. The method of claim 7, further comprising creating and storing only each of the one or more user extension security permissions that do not conflict with the default program security permissions, except when the logic specifies that the user extension security permissions can override the default program security permissions.

11. The method of claim 7, further comprising:
- storing the permission type, permission name, actions, and codebase identifier in a policy store;
- identifying a programmatic class of the user program extension that is associated with the request;
- determining a location from which the identified class has been loaded;
- determining a name of the resource from the request;
- determining an action associated with the request;
- searching the policy store for the location, name and action based on comparing the identified class to stored codebase identifiers.

12. The method of claim 7, further comprising:
- first determining whether the request violates the user extension security permissions and generating a user extension permission exception when a violation is determined;
- then determining whether the request violates the default program security permissions and generating a user extension permission exception when a violation is determined.

13. A non-transitory computer-readable storage medium storing instructions which when executed by one or more processors, cause the one or more processors to perform:
- creating and storing one or more default program security permissions in a network infrastructure device that is coupled to a network and that hosts an application program and one or more user program extensions to the application program;
- receiving a user-defined security policy that defines one or more user extension security permissions for the one or more user program extensions;
- wherein the one or more user extension security permissions are different from the one or more default program security permissions;
- testing whether each of the one or more user extension security permissions defined by a user conflicts with the default program security permissions;
- creating and storing each of the one or more user extension security permissions that does not conflict with the default program security permissions;
- receiving in the network infrastructure device a request from one of the user program extensions to access a resource of the apparatus or the network;
- permitting the request to access the resource or the network only when the access does not violate the user extension security permissions and the default program security permissions;
  - wherein the user-defined security policy comprises one or more extensible markup language (XML) documents each comprising one or more permission definitions each comprising a permission type, permission name, and one or more actions, and wherein each of the permission definitions is associated in the user-defined security policy with a codebase identifier.

\* \* \* \* \*